(12) United States Patent
Taveira et al.

(10) Patent No.: US 10,720,070 B2
(45) Date of Patent: Jul. 21, 2020

(54) ADJUSTABLE OBJECT AVOIDANCE PROXIMITY THRESHOLD OF A ROBOTIC VEHICLE BASED ON PRESENCE OF DETECTED PAYLOAD(S)

(71) Applicant: QUALCOMM Incorporated, San Diego, CA (US)

(72) Inventors: Michael Franco Taveira, Rancho Santa Fe, CA (US); Daniel Warren Mellinger, III, Philadelphia, PA (US)

(73) Assignee: Qualcomm Incorporated, San Diego, CA (US)

( * ) Notice: Subject to any disclaimer, the term of this patent is extended or adjusted under 35 U.S.C. 154(b) by 117 days.

(21) Appl. No.: 15/860,897

(22) Filed: Jan. 3, 2018

(65) Prior Publication Data
US 2019/0206268 A1 Jul. 4, 2019

(51) Int. Cl.
*G08G 5/04* (2006.01)
*G05D 1/00* (2006.01)
(Continued)

(52) U.S. Cl.
CPC .............. *G08G 5/04* (2013.01); *B64C 39/024* (2013.01); *G05D 1/0055* (2013.01);
(Continued)

(58) Field of Classification Search
CPC ....... G08G 5/04; G05D 1/0088; B64C 39/024
See application file for complete search history.

(56) References Cited

U.S. PATENT DOCUMENTS 4,809,178 A * 2/1989 Ninomiya ............ G05D 1/0255
318/587
5,979,824 A 11/1999 Gagliano et al.
(Continued)

FOREIGN PATENT DOCUMENTS

CN 204776022 U 11/2015
CN 106347656 A 1/2017
(Continued)

OTHER PUBLICATIONS

Dji et al., "Phantom 4: Prop Guards Installation Guide", Apr. 20, 2016 (Apr. 20, 2016), XP055546279, 5 Pages, Retrieved from the Internet: URL:https://dl.djicdn.com/downloads/phantom_4/en/En_Phantom_4_Prop_Guard_User_Guide_160420.pdf [retrieved on Jan. 23, 2019].
(Continued)

*Primary Examiner* — Ramsey Refai
(74) *Attorney, Agent, or Firm* — The Marbury Law Group

(57) ABSTRACT

Various embodiments include methods, devices, and robotic vehicles that adjust a proximity threshold implemented in a collision avoidance system based on whether a payload is being carried. Methods may include determining whether a payload is carried by the robotic vehicle, setting a proximity threshold for collision avoidance in response to determining that a payload is carried by the robotic vehicle, and controlling one or more motors of the robotic vehicle using the proximity threshold for collision avoidance. Some embodiments may include raising the proximity threshold when a payload is not being carried or decreasing proximity threshold when a payload is being carried. Some embodiments may include determining a classification of a payload and setting the proximity threshold based at least in part on the classification.

30 Claims, 8 Drawing Sheets

(51) Int. Cl.
    *B64C 39/02*     (2006.01)
    *G08G 5/00*     (2006.01)
    *G05D 1/02*     (2020.01)

(52) U.S. Cl.
    CPC .......... *G05D 1/0088* (2013.01); *G05D 1/0202* (2013.01); *G08G 5/006* (2013.01); *G08G 5/0013* (2013.01); *G08G 5/0021* (2013.01); *G08G 5/0069* (2013.01); *G08G 5/0086* (2013.01); *G08G 5/045* (2013.01); *B64C 2201/027* (2013.01); *B64C 2201/108* (2013.01); *B64C 2201/127* (2013.01); *B64C 2201/128* (2013.01); *B64C 2201/141* (2013.01)

(56) References Cited

U.S. PATENT DOCUMENTS

| | | | |
|---|---|---|---|
| 6,253,128 B1 * | 6/2001 | Kageyama | G05D 1/027 |
| | | | 180/168 |
| 6,270,038 B1 | 8/2001 | Cycon et al. | |
| 7,335,071 B1 | 2/2008 | Motsenbocker | |
| 8,239,125 B2 | 8/2012 | Petrie et al. | |
| 8,355,861 B2 | 1/2013 | Petrini | |
| 8,543,265 B2 | 9/2013 | Ekhaguere et al. | |
| 8,761,967 B2 | 6/2014 | Fisher et al. | |
| 9,043,052 B2 | 5/2015 | So et al. | |
| 9,261,879 B2 | 2/2016 | Ferguson et al. | |
| 9,421,869 B1 | 8/2016 | Ananthanarayanan et al. | |
| 9,609,288 B1 | 3/2017 | Richman et al. | |
| 9,613,539 B1 * | 4/2017 | Lindskog | B64D 17/80 |
| 9,632,507 B1 | 4/2017 | Korn | |
| 9,927,807 B1 * | 3/2018 | Ganjoo | H04W 4/70 |
| 2003/0051544 A1 | 3/2003 | Hong | |
| 2006/0192047 A1 | 8/2006 | Goossen | |
| 2007/0034734 A1 | 2/2007 | Yoeli | |
| 2007/0080793 A1 * | 4/2007 | Blase | B60Q 9/008 |
| | | | 340/435 |
| 2009/0283629 A1 | 11/2009 | Kroetsch et al. | |
| 2012/0025962 A1 | 2/2012 | Toll | |
| 2012/0025964 A1 * | 2/2012 | Beggs | B60Q 1/2673 |
| | | | 340/435 |
| 2014/0136044 A1 | 5/2014 | Conrad | |
| 2015/0269847 A1 * | 9/2015 | Knight | G05D 1/0083 |
| | | | 701/3 |
| 2015/0321759 A1 | 11/2015 | Caubel et al. | |
| 2016/0016664 A1 | 1/2016 | Basuni | |
| 2016/0023759 A1 | 1/2016 | Barrett et al. | |
| 2016/0039529 A1 | 2/2016 | Buchmueller et al. | |
| 2016/0075332 A1 * | 3/2016 | Edo-Ros | B60W 30/0956 |
| | | | 701/70 |
| 2016/0185345 A1 | 6/2016 | Sasabuchi et al. | |
| 2016/0200437 A1 | 7/2016 | Ryan et al. | |
| 2016/0247115 A1 | 8/2016 | Pons | |
| 2017/0029101 A1 | 2/2017 | Weissenberg et al. | |
| 2017/0043869 A1 | 2/2017 | Howard et al. | |
| 2017/0069214 A1 | 3/2017 | Dupray et al. | |
| 2017/0076616 A1 | 3/2017 | Kanade et al. | |
| 2017/0090480 A1 | 3/2017 | Ho et al. | |
| 2017/0132334 A1 | 5/2017 | Levinson et al. | |
| 2017/0144753 A1 | 5/2017 | Yu et al. | |
| 2017/0158320 A1 | 6/2017 | Bosch | |
| 2017/0177937 A1 | 6/2017 | Harmsen et al. | |
| 2017/0235018 A1 | 8/2017 | Foster et al. | |
| 2017/0242442 A1 | 8/2017 | Minster | |
| 2017/0255206 A1 * | 9/2017 | Chen | H04B 17/318 |
| 2017/0267234 A1 * | 9/2017 | Kemp | B60W 50/14 |
| 2017/0267347 A1 * | 9/2017 | Rinaldi | B64D 1/02 |
| 2017/0301249 A1 | 10/2017 | Kunzi et al. | |
| 2017/0313421 A1 | 11/2017 | Gil et al. | |
| 2017/0323256 A1 | 11/2017 | Cheatham, III et al. | |
| 2017/0339487 A1 * | 11/2017 | Alvord | H04R 3/005 |
| 2018/0155018 A1 | 6/2018 | Kovac et al. | |
| 2018/0246529 A1 * | 8/2018 | Hu | G05D 1/0202 |
| 2018/0275654 A1 * | 9/2018 | Merz | G08G 5/006 |
| 2018/0290748 A1 | 10/2018 | Corban et al. | |
| 2018/0297695 A1 | 10/2018 | Ramirez-Serrano | |
| 2019/0202449 A1 | 7/2019 | Taveira et al. | |
| 2019/0205609 A1 | 7/2019 | Taveira et al. | |
| 2019/0206266 A1 | 7/2019 | Taveira et al. | |
| 2019/0206267 A1 | 7/2019 | Taveira et al. | |
| 2019/0225327 A1 | 7/2019 | Kidakarn | |

FOREIGN PATENT DOCUMENTS

| | | |
|---|---|---|
| DE | 202013006196 U1 | 10/2014 |
| GB | 2483881 A | 3/2012 |
| KR | 20100027683 A | 3/2010 |
| WO | 2010135727 A1 | 11/2010 |
| WO | 2014027945 A1 | 2/2014 |
| WO | 2016053194 A1 | 4/2016 |
| WO | 2017043694 A1 | 3/2017 |
| WO | 2017086234 A1 | 5/2017 |
| WO | 2017168423 A1 | 10/2017 |
| WO | 2018032924 A1 | 2/2018 |

OTHER PUBLICATIONS

"PhantomPilots", Retrieved from Internet on Sep. 27, 2017, https://phantompilots.com/threads/propeller-guards-mounted-obstacle-avoidance-turned-of, pp. 1-9.

International Search Report and Written Opinion—PCT/US2018/063760—ISA/EPO—dated Mar. 22, 2019. 14 pages.

* cited by examiner

ADJUSTABLE OBJECT AVOIDANCE PROXIMITY THRESHOLD OF A ROBOTIC VEHICLE BASED ON PRESENCE OF DETECTED PAYLOAD(S)

BACKGROUND

Robotic vehicles, such as aerial robotic vehicles or "drones," are often used for a variety of applications, such as surveillance, photography, and/or cargo delivery. Many robotic vehicles use obstacle avoidance systems that work in conjunction with vehicle control systems to avoid hitting people, property, and objects. For example, once a robotic vehicle detects a nearby object, the obstacle avoidance system executing within the controller may prevent the robotic vehicle from approaching the object closer than some minimum distance (which is referred to herein as a "proximity threshold"). The proximity threshold is typically a fixed distance. In the case of aerial robotic vehicles that includes propeller blades, the proximity threshold may be a few feet to avoid damage and/or injury from contact with the spinning propeller blades.

SUMMARY

Various embodiments include robotic vehicles, systems, and methods for operating a robotic vehicle that adjusts how close the robotic vehicle will approach objects based upon whether a payload is carried by the robotic vehicle. In various embodiments, methods implemented by a processor of a robotic vehicle may include determining whether a payload is carried by the robotic vehicle, setting a proximity threshold for collision avoidance in response to determining that a payload is carried by the robotic vehicle, controlling one or more motors of the robotic vehicle using the proximity threshold for collision avoidance. In some embodiments, setting the proximity threshold for collision avoidance may include raising the proximity threshold from a first value to a second value that is higher than the first value in response to determining that a payload is not being carried by the robotic vehicle. In some embodiments, setting the proximity threshold for collision avoidance may include lowering the proximity threshold to a first value from a second value that is higher than the first value in response to determining that a payload is being carried by the robotic vehicle. In some embodiments, setting the proximity threshold for collision avoidance may include maintaining the proximity threshold at a currently set value.

In some embodiments, determining whether a payload is carried by the robotic vehicle may include obtaining data from a payload sensor configured to detect whether a payload is being carried by the robotic vehicle, and analyzing the obtained data to determine whether a payload is being carried by the robotic vehicle. In such embodiments, the payload sensor may be at least one of a contact sensor, a weight sensor, an image sensor, or a radio-frequency identification tag reader. In some embodiments, analyzing the obtained data to determine whether a payload is being carried by the robotic vehicle may include comparing the obtained data to previously collected data indicating a payload is being carried by the robotic vehicle, determining that a payload is carried by the robotic vehicle in response to determining that the obtained data match previously collected data indicating a payload is being carried by the robotic vehicle, and determining that a payload is not carried by the robotic vehicle in response to determining that the obtained data do not match the previously collected data indicating a payload is being carried by the robotic vehicle. In some embodiments, analyzing the obtained data to determine whether a payload is being carried by the robotic vehicle may include comparing the obtained data to predetermined parameters indicating one or more payloads is being carried by the robotic vehicle, determining that a payload is carried by the robotic vehicle in response to determining that the obtained data match the predetermined parameters indicating a payload is being carried by the robotic vehicle, and determining that a payload is not carried by the robotic vehicle in response to determining that the obtained data not matching the predetermined parameters indicating a payload is being carried by the robotic vehicle. In some embodiments, analyzing the obtained data to determine whether a payload is being carried by the robotic vehicle may include determining how many payloads are carried by the robotic vehicle.

Some embodiments may further include obtaining data from one or more motors indicating a rate of revolution of respective one or more motors, and analyzing the obtained data to determine whether a payload is being carried by the robotic vehicle.

Some embodiments may further include receiving an input override indicating whether a payload is carried by the robotic vehicle, and determining whether a payload is being carried by the robotic vehicle may be based on the received input override.

Some embodiments may further include determining a classification of the payload in response to determining that a payload is carried by the robotic vehicle, and setting the proximity threshold based on the classification of the payload. In such embodiments, setting the proximity threshold based on the classification of the payload may include changing the proximity threshold from a default value to an adjusted value corresponding to the classification of the payload. In such embodiments, determining a classification of the payload may include determining whether the payload is a proximity-sensitive class of payload, and setting the proximity threshold for collision avoidance to the value based on the classification of the payload may include increasing or decreasing the proximity threshold in response to the classification of the payload being the proximity-sensitive class of payload. In such embodiments, a proximity-sensitive class of payload may include one or more of a camera, rotors larger than a predetermined span, or equipment of the robotic vehicle or cargo more valuable than a predetermined amount. Some embodiments may further include determining the proximity threshold corresponding to the determined classification of the payload by accessing a data structure in memory for the proximity threshold correlated to the classification of the payload.

Some embodiments may further include obtaining object data from an object sensor configured to detect one or more objects in a vicinity of the robotic vehicle, determining whether one or more objects in a vicinity of the robotic vehicle pose an obstacle or potential obstacle to the robotic vehicle, and determining a classification of an object posing an obstacle or potential obstacle to the robotic vehicle. In such embodiments, adjusting the proximity threshold setting for collision avoidance may be based on a larger of the proximity threshold determined based on the classification of the payload and a proximity threshold for the classification of the object posing an obstacle or potential obstacle to the robotic vehicle.

Further embodiments include a robotic vehicle having a processor configured with processor-executable instructions to perform operations of any of the methods summarized above. Further embodiments include a processing device for use in a robotic vehicle configured to perform operations of any of the methods summarized above. Further embodiments include an aerial robotic vehicle having means for performing functions of any of the methods summarized above. Further embodiments include a non-transitory processor-readable media having stored thereon processor-executable instructions configured to cause a processor of a robotic vehicle to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
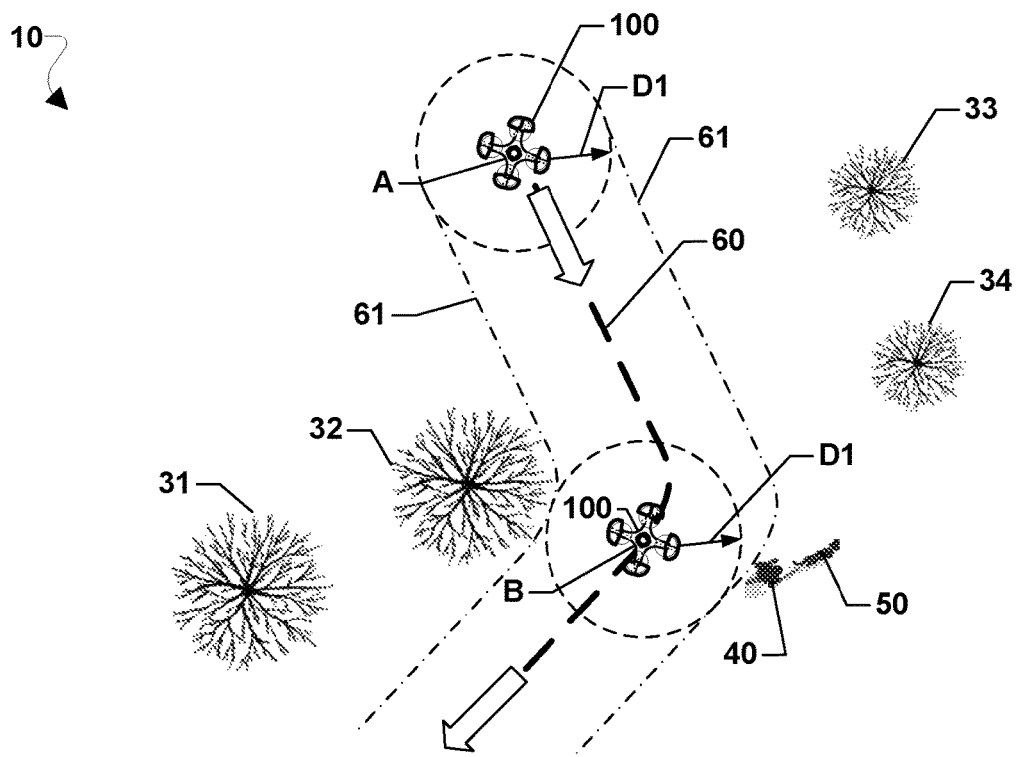
FIG. 1A is a plan view of an environment in which a robotic vehicle, not carrying a payload, is traveling along a path through various obstacles in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and robotic vehicles processing devices implementing such methods for operating the robotic vehicle. In particular, various embodiments determine whether one or more payloads are carried by the robotic vehicle from data obtained by one or more sensors and/or one or more motors of the robotic vehicle. The processing device sets a minimum approach distance (i.e., a proximity threshold) for collision avoidance based on the determination as to whether the one or more payloads is carried by the robotic vehicle. In addition, the processing device controls the one or more motors of the robotic vehicle using the proximity threshold set for collision avoidance.

The proximity threshold used by conventional obstacle avoidance systems is generally a fixed distance. However, that fixed distance may not be appropriate for all circumstances. For example, when a payload is carried by the robotic vehicle, a different proximity threshold may be appropriate, as compared to when no payload is carried by the robotic vehicle. Using too large a fixed proximity threshold may inhibit where or how a robotic vehicle operates. For example, in an environment with many objects, a large fixed proximity threshold may mean that the robotic vehicle can only operate within a small area or will not be able to reach other areas because two objects are too close to one another. Also, when no payload is carried by the robotic vehicle, there no risk of damage to or loss of a payload, in which case a large fixed proximity threshold may overly limit movement of the robotic vehicle.

Adjusting the proximity threshold used in the collision avoidance system may be based on a classification of one or more recognized payloads, which may enable robotic vehicles to operate with greater range than a binary determination regarding whether a payload is carried by the robotic vehicle. By setting a proximity threshold based on whether a payload is carried by the robotic vehicle, various embodiments may increase the safety of one or more payloads and/or maneuverability (i.e., freedom of movement). In some embodiments, the classification may be whether the payload(s) is/are sensitive or valuable. For example, the payload may be a valuable piece of onboard equipment, like a camera, or a piece of valuable cargo. In some embodiments, the classification may be based on a size of the payload, such as onboard equipment, like propellers, that may be larger than normal or cargo that is smaller or larger than normal. The proximity threshold assigned to the one or more payloads may vary depending upon the type or classification thereof, such as assigning a larger proximity threshold to valuable threshold than to non-valuable or less valuable thresholds. A default proximity threshold may be used for payloads for which a classification is not determined. In some embodiments, a processor of a robotic vehicle may determine a classification for an object that is being approached, and further adjust the proximity threshold used by the collision avoidance system based on that object's classification. In some embodiments, the processor of the robotic vehicle may classify all detected payloads and/or objects, determine an exclusion perimeter for each object based on the classification, and determine a detour path to remain outside the exclusion perimeter of all detected objects.

As used herein, the terms "robotic vehicle" and "drone" refer to one of various types of vehicles including an onboard computing device configured to provide some autonomous or semi-autonomous capabilities. Examples of robotic vehicles include but are not limited to: robotic vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

As used herein, the term "payload" refers to any load carried by the robotic vehicle that may be removed from or repositioned on the robotic vehicle. Payloads may include things that are carried by the robotic vehicle, including instruments (e.g., cameras, sensors, etc.), components, and cargo (e.g., goods or packages for delivery). Payloads may include temporary items, such as items, that are carried by the robotic vehicle for a limited duration. In addition, payloads may include long-term or permanent items necessary for the operation of the robotic vehicle. Payloads may be directly secured to the robotic vehicle, or indirectly secured through a payload attachment device, a compartment, and/or area of the robotic vehicle for holding the payload.

The term "obstacle" is used herein to refer to an object that a robotic vehicle must maneuver around to avoid a collision.

The term "proximity threshold" is used herein to refer to a minimum distance between an object and a robotic vehicle that a collision avoidance system will permit before controlling the robotic vehicle to stop or change a direction of travel away from the object. Similarly, the term "exclusion perimeter" is used herein to refer to a distance around an object that a robotic vehicle should avoid to ensure that the robotic vehicle remains outside the proximity threshold.

As used herein, the term "computing device" refers to an electronic device equipped with at least a processor. Examples of computing devices include processors within a security device, a robotic vehicle and/or a mission management computer that are onboard the robotic vehicle, as well as remote computing devices communicating with the robotic vehicle configured to perform operations of the various embodiments. Computing devices may include wireless communication devices (e.g., cellular telephones, wearable devices, smart-phones, web-pads, tablet computers, Internet enabled cellular telephones, Wi-Fi® enabled electronic devices, personal data assistants (PDAs), laptop computers, etc.), personal computers, and servers. In various embodiments, computing devices may be configured with memory and/or storage. Additionally, computing devices referred to in various example embodiments may be coupled to or include wireless communication capabilities implementing various embodiments, such as network transceiver(s) and antenna(s) configured to establish a local area network (LAN) connection (e.g., Wi-Fi® transceivers).

FIGS. 1A-1D illustrate plan views of an environment 10 in which robotic vehicles may travel, avoiding various obstacles therein. In particular, the environment 10 includes various trees 31, 32, 33, 34 and a human 40 walking a dog 50.

Operations of a robotic vehicle 100 using an adjustable proximity threshold for collision avoidance within the environment 10 are illustrated in FIG. 1A according to some embodiments. A processor of the robotic vehicle may determine whether one or more payloads is carried by the robotic vehicle based on data obtained from various sensors. This determination by the processor may be part of a pre-departure setup (i.e., before leaving from one location to another) and/or as part of a dynamic navigational analysis. In addition, in response to determining that one or more payloads are carried by the robotic vehicle, the processor may determine a classification of the payloads carried by the robotic vehicle. The processor may set a proximity threshold for collision avoidance to a value based on the determined classification of payload.

The robotic vehicle 100, which is an aerial robotic vehicle in the illustrated example, is not carrying any payloads or at least not carrying any "proximity-sensitive class of payload." As used herein, the expression "proximity-sensitive class of payload" refers to one or more types of payload that may demand, require, and/or benefit from the use of a proximity threshold value different from a default value of the proximity threshold. Examples of proximity-sensitive classes of payload include a camera, or other equipment of the robotic vehicle, and/or cargo.

The proximity threshold implemented on a robotic vehicle may depend upon the nature or purpose of the payload. For example, an operator, owner, or other entity associated with a robotic vehicle may want to keep a camera or other piece of valuable hardware away from people or objects that might tamper, compromise, and/or steal the hardware, in which case a large proximity threshold may be used to ensure the robotic vehicle stays far away from people and objects. Similarly, there may be a desire to keep valuable cargo away from people or objects, in which case a large proximity threshold may be used. In another example, if an operator or owner of the robotic vehicle desires to navigate a close to objects to obtain better images with a camera, a small proximity threshold may be used to enable the robotic vehicle to approach objects close enough for such photography. As a further example, for an aerial robotic vehicle, the proximity-sensitive class of payload may include rotors that are larger than a standard or particular size. Such larger rotors may be more dangerous for people or objects in proximity of the aerial robotic vehicle, thus a larger proximity threshold may be implemented on a robotic vehicle using rotors larger than a standard or particular size.

Since the robotic vehicle 100 in FIG. 1A is not carrying a proximity-sensitive class of payload, the processor may set the proximity threshold at the default value, corresponding to a first distance D1 (e.g., 10'). From position A, when the robotic vehicle 100 approaches objects (e.g., trees 31-34, the human 40, or the dog 50), the processor may process data received from onboard sensors (e.g., a camera, radar, lidar, etc.) to detect objects surrounding the robotic vehicle 100 and particularly obstacles to a first path 60. With the proximity threshold set at the first distance D1 (i.e., the default value), the robotic vehicle 100 is able to maneuver or follow user control commands to move (e.g., flying) between the detected objects, such as along the initial part of the first path 60 between trees 32, 33 and 34. The first proximity threshold at a distance D1 permits the robotic vehicle 100 to transit a first path 61 that will be clear of objects detected by the onboard sensors. Once the robotic vehicle 100 reaches position B, near the human 40 and the dog 50, the default value of the proximity threshold may allow the robotic vehicle 100 to further progress between the human 40 and the one tree 32. Thus, the robotic vehicle 100 is able to travel a somewhat direct path through various obstacles when using the default value of the proximity threshold.

Figure 1B:
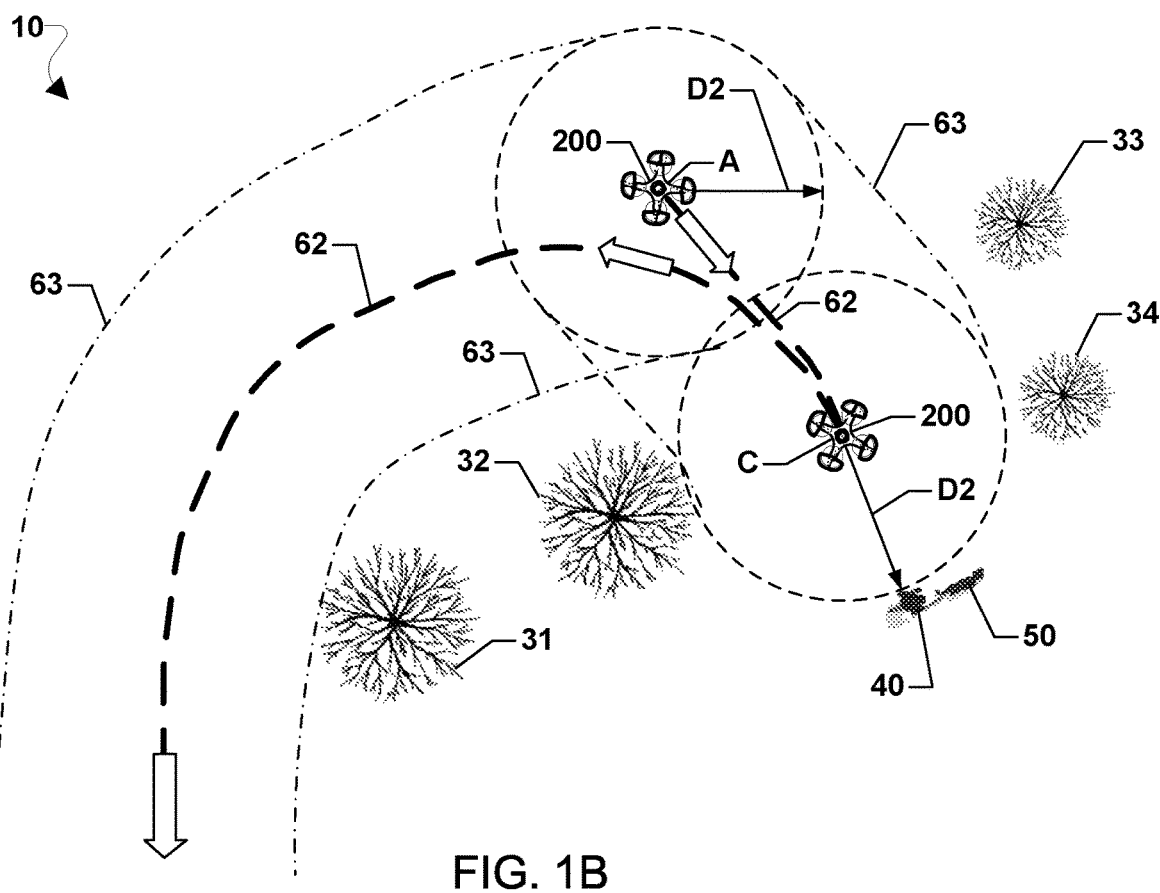
FIG. 1B is a plan view of the environment of FIG. 1A, in which a robotic vehicle, carrying a payload, is traveling a more indirect path around various obstacles in accordance with various embodiments.

In contrast, when the robotic vehicle is carrying a proximity-sensitive class of payload, a larger proximity threshold may be implemented, which may limit routes that may be followed around objects. Operations of a robotic vehicle 200, which is carrying a proximity-sensitive class of payload, within the environment 10 are illustrated in FIG. 1B according to some embodiments. With reference to FIG. 1A-1B, a processor of the robotic vehicle may determine whether one or more payloads is carried by the robotic vehicle based on data obtained from sensors. The determination by the processor may be part of a pre-departure setup and/or as part of a dynamic navigational analysis. In response to determining that one or more payloads is carried by the robotic vehicle, the processor may determine a classification of a payload carried by the robotic vehicle. The processor may set a proximity threshold for collision avoidance to a value based on the determined classification of payload.

The robotic vehicle 200 illustrated in FIG. 1B is carrying one or more payloads and at least one of the one or more payloads is a proximity-sensitive class of payload. Thus, since the robotic vehicle 200 is carrying a proximity-sensitive class of payload, the processor may set the proximity threshold to a second distance D2 (e.g., twenty feet) that is a higher value than the default value (i.e., first distance D1). During navigational movements, the processor of the robotic vehicle 200 may apply the adjusted proximity threshold to maintain at least the second distance D2 from any obstacles. From position A, with the proximity threshold set at the second distance D2, the robotic vehicle 200 is able to maneuver or follow user control commands to fly between the detected objects, such as along the initial part of the second path 62 between trees 32, 33 and 34. The second distance D2 of the proximity threshold establishes a second path boundary 63 that will be clear of objects detected by the onboard sensors. However, once the robotic vehicle 100 reaches position C, near the human 40 and the dog 50, the collision avoidance system implementing the proximity threshold will prohibit further progress in the direction of those objects. At position C, two of the trees 32, 34 also prevent lateral movement. Thus, the robotic vehicle 100 is forced to backtrack and take a more indirect route around the obstacles.

Figure 1C:
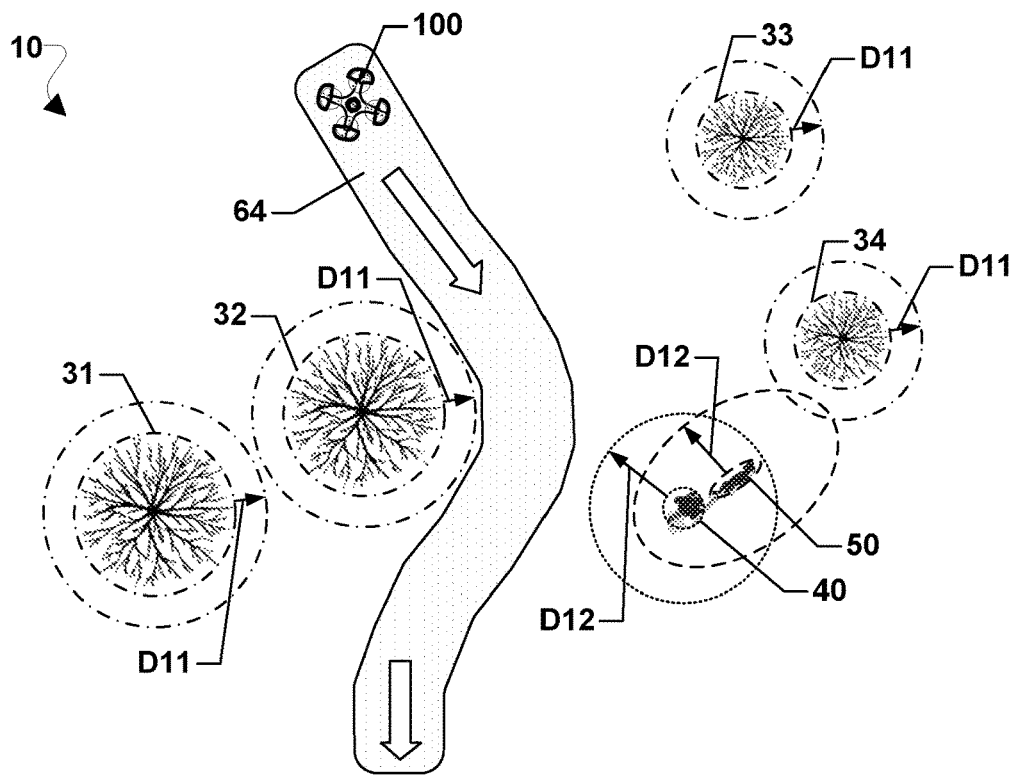
FIG. 1C is a plan view of the environment of FIGS. 1A-1B, in which a robotic vehicle, not carrying a payload, performs path-planning to travel along a path through various obstacles in accordance with various embodiments.

FIG. 1C illustrates a further embodiment in which one or more proximity thresholds for various objects detected by a processor of a robotic vehicle, in combination with payload detection, may be used in planning a path to avoid approaching any object closer than an appropriate proximity threshold. With reference to FIGS. 1A-1C, a processor of the robotic vehicle 100 may evaluate the detected objects (e.g., the trees 31-34, the human 40, and the dog 50) and apply appropriate proximity thresholds to each object. In the example illustrated in FIG. 1C, the robotic vehicle 100 is not carrying any proximity-sensitive payload. Thus, the processor may set the proximity threshold to a default value. In some embodiments, there may be more than one default value, each configured for different types of objects or obstacles that the robotic vehicle may encounter. For example, the processor may set the proximity threshold to a first default value associated with static objects (i.e., not moving) or a second default value associated with dynamic objects (i.e., moving). The first default value may be a first distance D11 and the second default value may be a second distance D12.

The processor may determine a boundary surrounding each of the observed objects 31-34, 40, 50 corresponding to the particular proximity threshold associated with that object as implemented in the collision avoidance system. Because the various objects have differing appropriate proximity thresholds as described, the processor may take into account all of the determined proximity thresholds in order to plot an avoidance path 64 between some of the detected objects. The processor may generate an internal map that enables the processor to determine the avoidance path 64 and ensure the robotic vehicle 100 does not approach any of the objects closer than their corresponding proximity threshold.

Figure 1D:
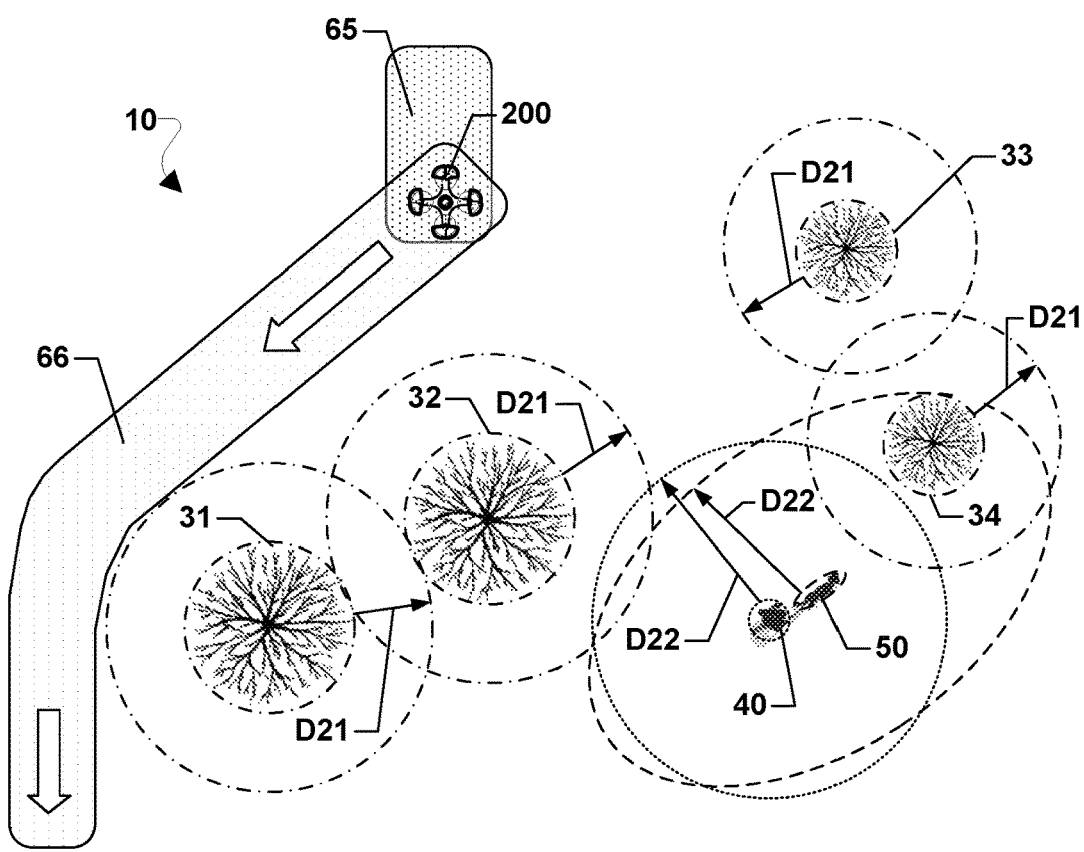
FIG. 1D is a plan view of the environment of FIGS. 1A-1C, in which a robotic vehicle, carrying a payload, performs path-planning to travel an indirect path around various obstacles, in accordance with various embodiments.

In contrast to the example illustrated in FIG. 1C, with a proximity-sensitive class of payload carried by the robotic vehicle, the processor may set a larger exclusion boundary around objects depending on the particular classification of the payload and the types of objects detected. FIG. 1D illustrates a further embodiment in which one or more proximity thresholds for various objects detected by a processor of a robotic vehicle, in combination with payload detection, may be used in planning a path to avoid approaching any object closer than an appropriate proximity threshold. With reference to FIGS. 1A-1D, the robotic vehicle 200 in the example illustrated in FIG. 1D is carrying a proximity-sensitive class of payload. Thus, the processor may set the proximity threshold to one or more non-default values. In accordance with some embodiments, there may be more than one non-default value, each configured for different types of objects or obstacles that the robotic vehicle may encounter. For example, the processor may set the proximity threshold to a first non-default value associated with static objects (i.e., not moving) or a second non-default value associated with dynamic objects (i.e., moving). The first non-default value may be a third distance D21 and the second non-default value may be a fourth distance D22. The non-default values may be higher or lower than the default values depending on the particular classification of the payload and the type of object detected.

While traveling along an initial path 65, the robotic vehicle 200 will eventually detect objects in its path, such as the trees 31-34, the human 40, and the dog 50. In some embodiments, a processor of the robotic vehicle 200 may evaluate the detected objects, such as through visual processing and image recognition methods and/or additional object location methods, to determine positions, sizes, or other characteristics (e.g., whether the objects are stationary or moving) of each of the objects 31-34, 40, 50.

In addition, the processor of the robotic vehicle 200 may determine that one or more proximity-sensitive payloads are carried by the robotic vehicle based on obtained data, and use that determination to set one or more proximity thresholds to be applied around detected objects. In some embodiments, the processor may apply different values to the proximity thresholds for different types of objects, such as a first proximity threshold for static objects and a second proximity threshold for moving (i.e., dynamic) objects. For example, the processor may use one proximity threshold for stationary objects, like the trees 31-34, and a different larger proximity threshold for the moving creatures, the human 40 and the dog 50. Since the robotic vehicle 200 is carrying one or more payloads, the processor may set proximity thresholds that are a higher value than those used when no payloads are carried by the robotic vehicle. Thus, the processor may set a static-object proximity threshold to a third distance D21 and a dynamic-object proximity threshold to a fourth distance D22, both first and second distances D21, D22 being a higher value than those used if no payloads were carried by the robotic vehicle.

The processor may then determine a boundary surrounding each of the observed objects 31-34, 40, 50 corresponding to the particular proximity threshold associated with that object as implemented in the collision avoidance system. Because the various objects have differing appropriate proximity thresholds as described, the processor may take into account all of the determined proximity thresholds in order to plot an avoidance path 66 around all detected objects. In order to do so efficiently, the processor may generate an internal map that includes locations of each of the detected objects and calculates an exclusion perimeter around each object based upon the proximity threshold appropriate for that object. Such an internal map may enable the processor to then determine the avoidance path 66 without having to backtrack and ensure the robotic vehicle 200 does not approach any of the objects closer than their corresponding proximity threshold.

Figure 2:
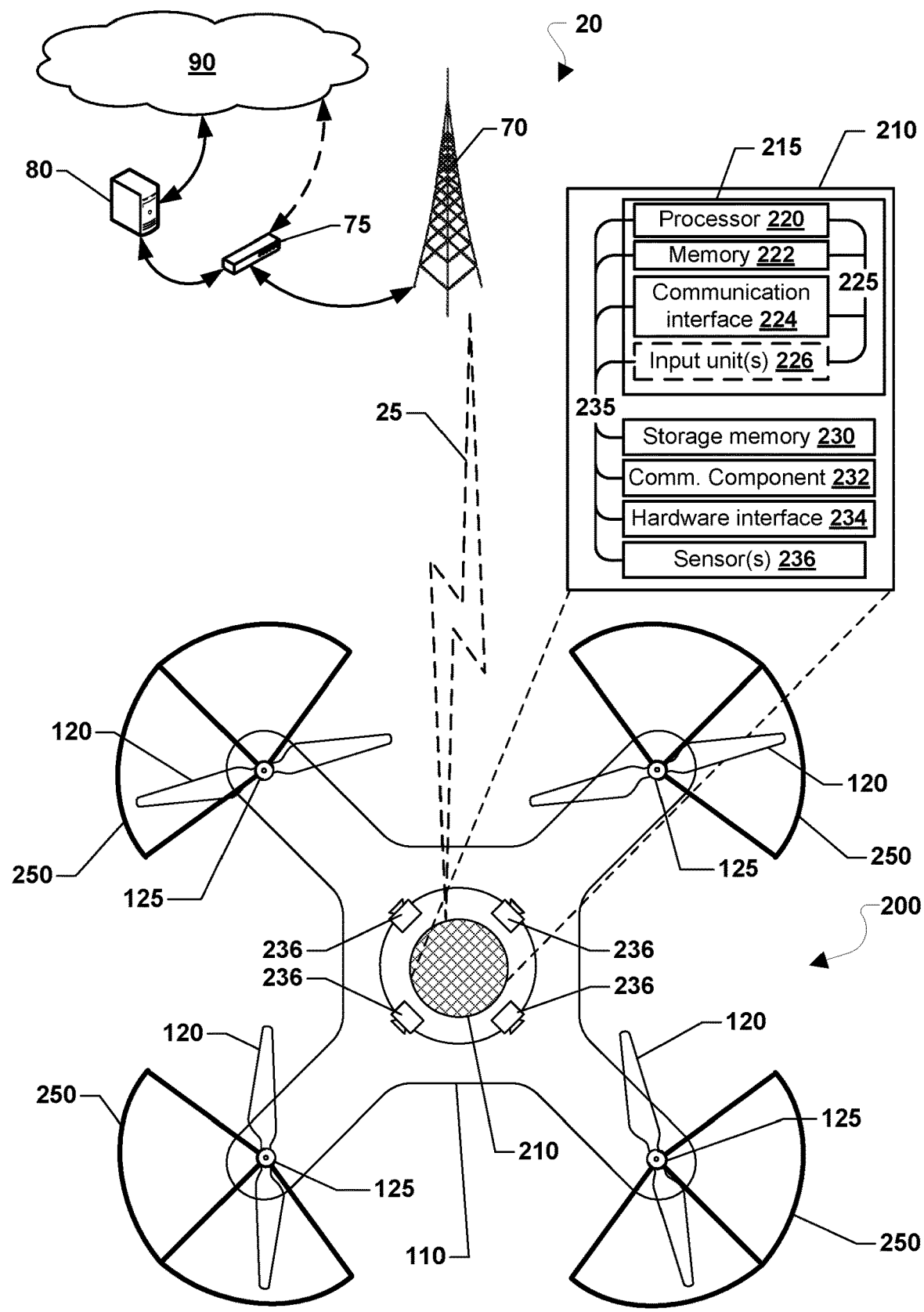
FIG. 2 is a block diagram illustrating components of a robotic vehicle and a ground station suitable for use in various embodiments.

Various embodiments may be implemented within a variety of robotic vehicles configured to communicate with one or more communication networks, an example of which in the form of a robotic vehicle 200 suitable for use with various embodiments is illustrated in FIG. 2. With reference to FIGS. 1A-2, the robotic vehicle 200, operating in a mission environment 20, may include a plurality of rotors 120 (e.g., four rotors), each driven by a corresponding motor 125. A body 110 of the robotic vehicle 200 may support the plurality of rotors 120 and motors 125.

The robotic vehicle 200 may include one or more onboard sensors, such as one or more cameras 236, or other sensors like contact sensors, weight sensors, or a radio-frequency identification reader. The robotic vehicle 200 may include a processing device 210, which may further include one or more attitude sensors, such as an altimeter, a gyroscope, accelerometers, an electronic compass, a satellite positioning system receiver, etc., that may be used by the processor 220 to determine vehicle attitude and location information for controlling movement and navigation.

Cameras 236 may be disposed in various locations on the robotic vehicle 200 and different types of camera may be used. For example, a first set of cameras 236 may face a side of each of the rotors 120 in the plane of rotation thereof, such as mounted near a central part of the robotic vehicle 200. Additionally, or alternatively, second set of cameras 236 may be mounted under the rotors 120, such as in a position configured to detect whether cargo, rotors 120, propeller guards 250, or other equipment are installed on the robotic vehicle 200. The robotic vehicle 200 may also include other types of sensors, including detection and ranging sensors, such as radar, sonar, lidar, and the like.

Image data generated by the cameras 236, as well as data from one or more other types of sensors (e.g., radar, sonar, lidar, etc.), may be used by an object avoidance system executing in the processor 220. In various embodiments, image and other sensor data received from cameras 236 may be processed by an object avoidance system to detect whether certain payloads are carried by the robotic vehicle 200. The image data received from cameras 236 may also be processed by an object avoidance system to determine a classification of payload determined to be carried by the robotic vehicle 200. In some embodiments, active sensors (not shown) located in a cargo hold or attachment point, but still on the robotic vehicle, may enable the processor to detect the presence of a payload by measuring certain materials embedded in or on the payload.

The robotic vehicle 200 may include a processing device 210 that may be coupled to each of the plurality of motors 125 that drive the rotors 120. The processing device 210 may be configured to monitor and control the various functionalities, sub-systems, and components of the robotic vehicle 200. For example, the processing device 210 may be configured to monitor and control various modules, software, instructions, circuitry, hardware, etc. related to propulsion, navigation, power management, sensor management, and/or stability management.

The processing device 210 may house various circuits and devices used to control the operation of the robotic vehicle 200. For example, the processing device 210 may include a processor 220 that directs the control of the robotic vehicle 200. The processor 220 may include one or more processors configured to execute processor-executable instructions (e.g., applications, routines, scripts, instruction sets, etc.) to control movement, antenna usage, and other operations of the robotic vehicle 200, including operations of various embodiments. In some embodiments, the processing device 210 may include memory 222 coupled to the processor 220 and configured to store data (e.g., navigational plans, obtained sensor data, received messages/inputs, applications, etc.). The processor 220 and memory 222 may be configured as or be included within a system-on-chip (SoC) 215 along with additional elements such as (but not limited to) a communication interface 224, one or more input units 226, non-volatile storage memory 230, and a hardware interface 234 configured for interfacing the SoC 215 with hardware and components of the robotic vehicle 200. Components within the processing device 210 and/or the SoC 215 may be coupled together by various circuits, such as a bus 225, 235 or another similar circuitry.

The processing device 210 may include more than one SoC 215 thereby increasing the number of processors 220 and processor cores. The processing device 210 may also include processors 220 that are not associated with the SoC 215. Individual processors 220 may be multi-core processors. The processors 220 may each be configured for specific purposes that may be the same as or different from other processors 220 of the processing device 210 or SoC 215. One or more of the processors 220 and processor cores of the same or different configurations may be grouped together. A group of processors 220 or processor cores may be referred to as a multi-processor cluster.

The terms "system-on-chip" or "SoC" are used herein to refer to a set of interconnected electronic circuits typically, but not exclusively, including one or more processors (e.g., 220), a memory (e.g., 222), and a communication interface (e.g., 224). The SoC 215 may include a variety of different types of processors 220 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 215 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

In various embodiments, the processing device 210 may include or be coupled to one or more communication components 232, such as a wireless transceiver, an onboard antenna, and/or the like for transmitting and receiving wireless signals through the wireless communication link 25. The one or more communication components 232 may be coupled to the communication interface 224 and may be configured to handle wireless wide area network (WWAN) communication signals (e.g., cellular data networks) and/or wireless local area network (WLAN) communication signals (e.g., Wi-Fi signals, Bluetooth signals, etc.) associated with ground-based transmitters/receivers (e.g., base stations, beacons, Wi-Fi access points, Bluetooth beacons, small cells (picocells, femtocells, etc.), etc.). The one or more communication components 232 may receive data from radio nodes, such as navigation beacons (e.g., very high frequency (VHF) omni-directional range (VOR) beacons), Wi-Fi access points, cellular network base stations, radio stations, etc.

The processing device 210, using the processor 220, the one or more communication components 232, and an antenna may be configured to conduct wireless communications with a variety of remote computing devices, examples of which include the base station or cell tower (e.g., base station 70), a beacon, server, a smartphone, a tablet, or another computing device with which the robotic vehicle 200 may communicate. The processor 220 may establish the wireless communication link 25 via a modem and the antenna. In some embodiments, the one or more communication components 232 may be configured to support multiple connections with different remote computing devices using different radio access technologies. In some embodiments, the one or more communication components 232 and the processor 220 may communicate over a secured communication link. The security communication links may use encryption or another secure means of communication in order to secure the communication between the one or more communication components 232 and the processor 220.

The robotic vehicle 200 may operate in the mission environment 20 communicating with a base station 70, which may provide a communication link to a remote computing device 75 and/or a remote server 80 via a communication network 90. The base station 70 may provide the wireless communication link 25, such as through wireless signals to the robotic vehicle 200. The remote computing device 75 may be configured to control the base station 70, the robotic vehicle 200, and/or control wireless communications over a wide area network, such as providing a wireless access points and/or other similar network access point using the base station 70. In addition, the remote computing device 75 and/or the communication network 90 may provide access to a remote server 80. The robotic vehicle 200 may be configured to communicate with the remote computing device 75 and/or the remote server 80 for exchanging various types of communications and data, including location information, navigational commands, data inquiries, and mission data.

Robotic vehicles may navigate or determine positioning using altimeters or navigation systems, such as Global Navigation Satellite System (GNSS), Global Positioning System (GPS), etc. In some embodiments, the robotic vehicle 200 may use an alternate source of positioning signals (i.e., other than GNSS, GPS, etc.). The robotic vehicle 200 may use position information associated with the source of the alternate signals together with additional information (e.g., dead reckoning in combination with last trusted GNSS/GPS location, dead reckoning in combination with a position of the robotic vehicle takeoff zone, etc.) for positioning and navigation in some applications. Thus, the robotic vehicle 200 may navigate using a combination of navigation techniques, including dead-reckoning, camera-based recognition of the land features below and around the robotic vehicle 200 (e.g., recognizing a road, landmarks, highway signage, etc.), etc. that may be used instead of or in combination with GNSS/GPS location determination and triangulation or trilateration based on known locations of detected wireless access points.

In some embodiments, the processing device 210 of the robotic vehicle 200 may use one or more of various input units 226 for receiving control instructions, data from human operators or automated/pre-programmed controls, and/or for collecting data indicating various conditions relevant to the robotic vehicle 200. For example, the input units 226 may receive input from one or more of various components, such as camera(s) or other imaging sensors, detection and ranging sensors (e.g., radar, sonar, lidar, etc.), microphone(s), position information functionalities (e.g., a global positioning system (GPS) receiver for receiving GPS coordinates), navigational instruments (e.g., attitude indicator(s), gyroscope(s), anemometer, accelerometer(s), altimeter(s), compass(es), etc.), keypad(s), etc. The camera(s) may be optimized for daytime and/or nighttime operation.

Aerial robotic vehicles may be winged or rotor craft varieties. For example, the robotic vehicle 200 may be a rotary propulsion design that utilizes one or more rotors 120 driven by corresponding motors to provide lift-off (or take-off) as well as other aerial movements (e.g., forward progression, ascension, descending, lateral movements, tilting, rotating, etc.). The robotic vehicle 200 is illustrated as an example of an aerial robotic vehicle that may utilize various embodiments, but is not intended to imply or require that various embodiments are limited to a quad-rotor aircraft.

The processor 220 of the robotic vehicle 200 may perform monitoring operations (e.g., data collection and processing) before, during, and/or after moving, such as by accessing readings from on-board sensors to determine whether one or more payloads is carried by the robotic vehicle. In particular, the processor may receive and analyze images (i.e., video or still images) from one or more cameras (e.g., cameras 236). The images received by the processor may show all or part of one or more regions of the robotic vehicle in which payloads may be carried. For example, camera may be disposed to provide images of the areas where equipment may be mounted and/or where payload may be secured.

In some embodiments, the processor may determine whether a payload is present through visual processing and image recognition methods. For example, images received by the processor of a cargo area may be compared to previously stored images of that cargo area empty and/or holding cargo. In addition, the detected structures of the payload may be analyzed to determine a classification of any payload determined to be carried by the robotic vehicle. In addition, other sensors, such as a contact sensor, a weight sensor, and/or a radio-frequency identification (RFID) reader may be used to detect whether a payload is present and, if detected, a classification of the detected payload. In some embodiments, the processor may be configured to determine that a payload is present when any structure is detected in an otherwise empty space. In other embodiments, the processor may be configured to only determine that a payload is present when a specific payload or type of payload is identified as being present.

In some embodiments, the processor may determine specific identities of detected payloads or classifications of payloads, such as recognizing particular structures (e.g., using shape recognition) or reading labels/markings on a structure (e.g., a bar-code) for which the processor may be trained (e.g., through an initial training routine) and for which particular (e.g., user-assigned) proximity threshold values may be specified. The more specific the classification, the more different proximity thresholds may be assigned to various objects by the processor. As part of classifying payloads, the processor may determine that some structures cannot be classified, in which case the determined classification may be unknown or a default classification. In some embodiments, the operations of classifying payloads may be performed for all detected structures carried by the robotic vehicle. In some embodiments, once a class of payload associated with a largest value of proximity threshold is detected, the processor may stop classifying payloads until the detected structure is removed.

Figure 3:
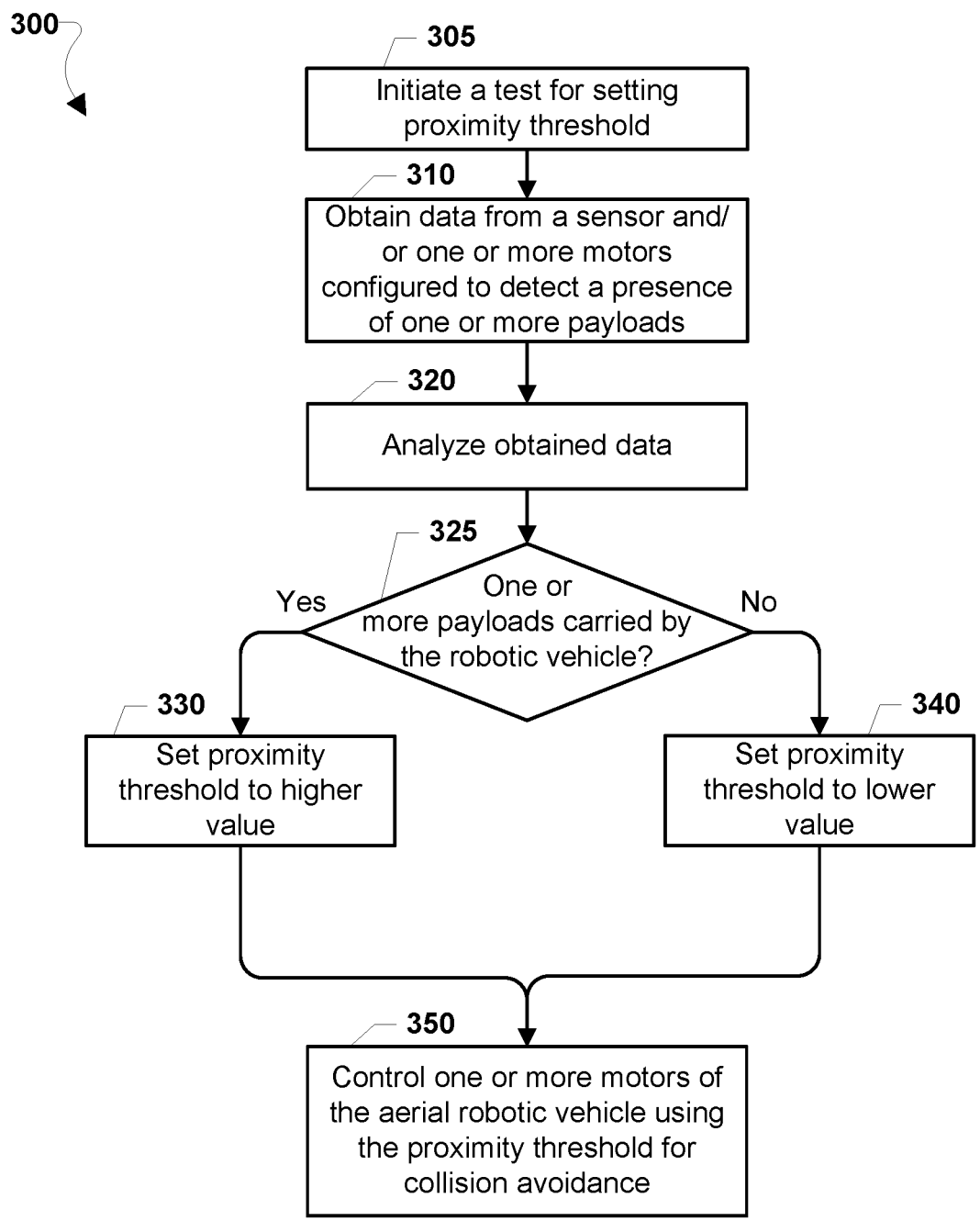
FIG. 3 is a process flow diagram illustrating a method for operating a robotic vehicle, in response to determining whether one or more payloads is carried by the robotic vehicle according to some embodiments.

FIG. 3 illustrates a method 300 for operating a robotic vehicle according to some embodiments. With reference to FIGS. 1A-3, the method 300 may be performed by a processor, such as a processor (220) within a processing device (e.g., 210) of a robotic vehicle (e.g., 100, 200) to detect whether one or more payloads (e.g., cameras 236) is carried by the robotic vehicle and set a proximity threshold accordingly in response thereto.

In block 305, the processor may initiate a test for setting the proximity threshold. The test for setting the proximity threshold may be initiated at start-up (i.e., when the processor is turned on or woken up from a sleep mode). Additionally, the test for setting the proximity threshold may be initiated when conditions change. For example, upon receipt by the processor of an input from a sensor, like a contact sensor, the test for setting the proximity threshold may be automatically initiated. As a further example, in response to an event, such as a crash or heavy impact to the robotic vehicle, the processor may force the initiation of the test for setting the proximity threshold. In addition, the robotic vehicle may be configured to receive an input override from an operator or control system indicating that a payload is or is not present, or particularly that a proximity-sensitive payload is or is not present. The input override may supersede any determination regarding whether a payload is carried by the robotic vehicle based on sensor data.

In some embodiments, the processor may repeat the operations of the method 300 to detect and respond to payloads detected as being carried or removed from the robotic vehicle. For example, the processor may repeat the operations of the method 300 continuously or until all detected payloads are identified to ensure safe and proper operation of the robotic vehicle. As another example, the processor may repeat the operations of the method 300 for a predefined number of iterations indicated in pre-departure testing instructions provided to the robotic vehicle before launch (e.g., before take-off). Thereafter, the processor may optionally repeat the operations of the method 300 at regular intervals en route to a destination or at other times established for doing so.

In block 310, the processor may obtain data from one or more sensors that are configured to detect a presence of one or more payloads. Additionally or alternatively as part of the operations in block 310, the processor may obtain propeller rotation speed data from one or more electronic speed controllers (ESCs) driving a motor indicating a rate of revolutions (e.g., revolutions per minute (RPM)) and/or one or more motors of the robotic vehicle that can be analyzed to determine whether one or more payload is carried by the robotic vehicle. Such obtained data may be stored in local memory, such as a buffer, to support image processing in subsequent operations. The obtained data may be stored for tracking usage history or incident data (e.g., an unusual circumstance detected). In addition, stored data may be used for subsequent comparison with image analysis for recognizing the same payloads, if removed and later reinstalled on the robotic vehicle.

Cameras (e.g., 236) may be used exclusively or in combination with other sensors. One or more cameras may be mounted in cargo holding areas or other areas where payloads may get mounted or secured. Camera images may be analyzed to detect a payload or the removal thereof. The processor may receive images from one or more cameras (e.g., 236) that image structures that may potentially be identified as a payload, and thus will image payloads, if in place. In some implementations, the processor may receive image data from multiple cameras, which may enable the processor to better assess structures carried by the robotic vehicle to determine whether such structures are a payload and if such structures are a payload, what class of payload.

The processor may additionally or alternatively receive data from other types of sensors, such as contact sensors and/or weight sensors that are activated when payloads are installed or loaded on the robotic vehicle. Conductive material may be embedded in or on a payload, which when in contact with a receiving conductive material of the robotic vehicle may indicate a payload is carried by the robotic vehicle, and optionally what class of payload is carried thereby. Similarly, a portion of the robotic vehicle (e.g., where payload get mounted or carried) may include strain gauges that are configured to detect when a payload is present. Also, resistive or capacitive sensors may be attached to or embedded in payloads. Additionally, or alternatively, active sensors mounted on a body of the robotic vehicle, but remote from the payload, may measure passive material embedded in or on one or more payloads. For example, the processor may receive data from an RFID reader configured to detect the presence of an RFID transmitter that may be included on or embedded in a payload for detection by the processor.

In some embodiments in which the processor additionally or alternatively receives data from one or more motors of the aerial robotic vehicle indicating a rate of revolution (e.g., RPM) of the respective one or more rotors, the processor may use the rate of revolution of the one or more motors to determine whether a payload is carried by the robotic vehicle. The rate of revolution of a motor may be directly related to the thrust produced by a propeller associated with that motor. When a payload is carried by the robotic vehicle, the robotic vehicle will weigh more. Such extra weight may require the motors to spin faster in order to maintain a steady speed, level flight, or perform maneuvers. This extra weight may be deduced from the rate of revolution of the motors, which may be associated with something extra being installed on the robotic vehicle, such as one or more payloads.

In block 320, the processor (or another processor configured to perform such analysis) may analyze the obtained sensor data to determine whether one or more payloads is being carried by the robotic vehicle. For example, using camera image data, the processor may perform image processing analysis to detect edges, masses and other features characteristic of one or more payloads within the field of view. As another example, the processor may recognize contact and/or weight sensor signals, as well as signals from an RFID reader if included, that indicate one or more payloads is being carried by the robotic vehicle.

Alternatively or additionally, the processor may be configured to obtain data from one or more motors or an electronic speed controller (ESC) driving a motor indicating a rate of revolutions (e.g., RPM), which may be analyzed for determining whether one or more payload is carried by the robotic vehicle. Since a payload will add weight to a robotic vehicle, analyzing propeller RPM data may involve comparing the current RPM to a data table storing an RPM range required to move, hover, or maneuver with one or more payload being carried by the robotic vehicle.

Additionally, the center of gravity of the robotic vehicle may change if one or more payloads is being carried by the robotic vehicle, which may be detected by comparing the rate of revolution of the various rotors. The rates of revolution of the one or more rotors may be slightly higher when the geometric center of the robotic vehicle does not coincide with the vehicle's center of gravity. Additionally, during motion of the robotic vehicle, the processor may consider angular velocity data in conjunction with the rotor rate of revolution data to compute a moment of inertia of the robotic vehicle. If the computed moment of inertia is different from a base-line or default, this may be an indication that additional mass consistent with one or more payloads being carried by the robotic vehicle have been removed.

In some embodiments, the analysis regarding whether one or more payloads is being carried by the robotic vehicle may be based solely on detection of the presence of one or more payloads (e.g., receiving an indication one or more payload is installed from a contact sensor). In some embodiments, the determination regarding whether one or more payloads is being carried by the robotic vehicle may involve further analysis regarding characteristics of structures carried by the robotic vehicle to determine whether such structures are one or more payloads.

In determination block 325, the processor may determine whether one or more payloads are being carried by the robotic vehicle based on the data analyzed in block 320.

In response to determining that one or more payloads is being carried by the robotic vehicle (i.e., determination block 325="Yes"), the processor may set the proximity threshold to a higher value in block 330. The higher value proximity threshold may be a distance considered to be safe or non-threaten to the one or more payload carried by the robotic vehicle. In contrast, a lower value proximity threshold may be used when no payload is carried by the robotic vehicle.

In response to determining that one or more payloads is not being carried by the robotic vehicle (i.e., determination block 325="No"), the processor may set the proximity threshold to the lower value in block 340.

Setting the proximity threshold in blocks 330 and/or 340 may or may not involve changing the current proximity threshold value, depending on the current proximity threshold setting and the appropriate proximity threshold setting based on the determination as to whether one or more payloads are being carried by the robotic vehicle. For example, setting the proximity threshold for collision avoidance may include raising the proximity threshold from a first value to a second value that is higher than the first value in response to determining that one or more payloads are being carried by the robotic vehicle. As a further example, setting the proximity threshold for collision avoidance may include lowering the proximity threshold to the first value from the second value in response to determining that one or more payloads are not being carried by the robotic vehicle. Setting the proximity threshold for collision avoidance may also include maintaining the proximity threshold at a currently set value. For example, setting the proximity threshold for collision avoidance may include leaving the proximity threshold at the first value, which is lower than the second value, in response to determining that no payloads are being carried by the robotic vehicle and the currently set value of the proximity threshold is the first value. As a further example, setting the proximity threshold for collision avoidance may include leaving the proximity threshold at the second value, which is higher than the first value, in response to determining that one or more payloads are being carried by the robotic vehicle and the currently set value of the proximity threshold is the second value.

In block 350, the processor may control one or more motors of the robotic vehicle to govern how the robotic vehicle navigates using the currently set proximity threshold. For example, the processor may send signals to control one or more of the motors (e.g., 125) of the robotic vehicle (e.g., 100, 200) for navigation. The processor may control one or more motors to avoid obstacles while maintaining a distance from obstacles, near a navigational path of the robotic vehicle, according to the proximity threshold (i.e., set in blocks 340 or 345). In some embodiments, the robotic vehicle may continue to operate normally executing user commands and/or a preloaded navigational plan relying on the collision avoidance system to prevent approaching any object closer than the current setting of the proximity threshold. In some embodiments, the processor may modify control of the robotic vehicle, such as to adjust or modify a preloaded navigational plan to ensure that the robotic vehicle does not approach a detected obstacle closer than the current setting of the proximity threshold.

Figure 4:
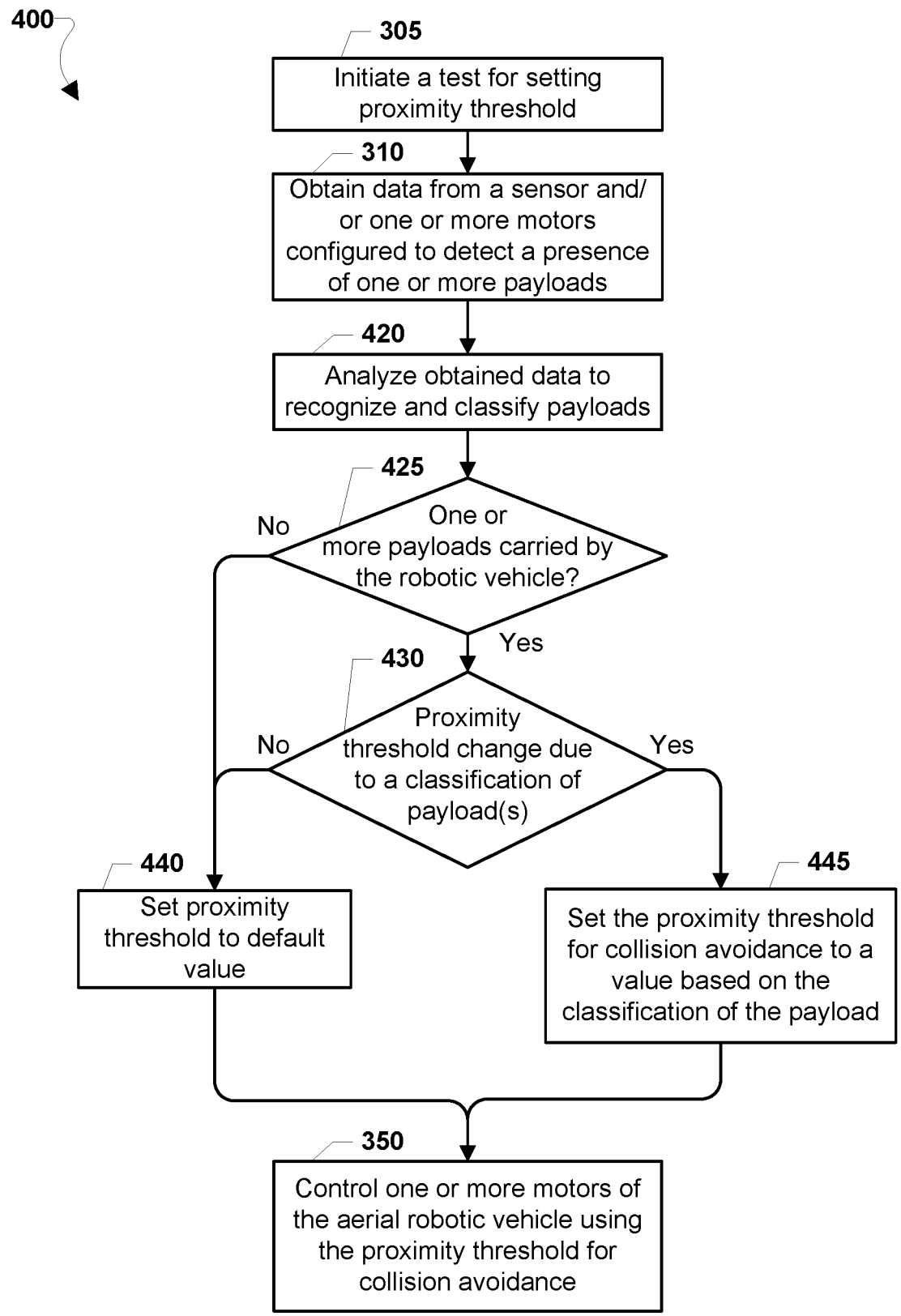
FIG. 4 is a process flow diagram illustrating a method for operating a robotic vehicle including determining a classification of a payload determined to be carried by the robotic vehicle according to some embodiments.

FIG. 4 illustrates a method 400 for operating a robotic vehicle according to some embodiments. With reference to FIGS. 1-4, the method 400 may be performed by a processor, such as a processor (e.g., 220) within a processing device (e.g., 210) of a robotic vehicle (e.g., 100, 200) to detect whether one or more payloads (e.g., cameras 236) are carried by the robotic vehicle and set a proximity threshold accordingly in response thereto. In the method 400, the processor may perform operations of blocks 305, 310, and 350 of the method 300 as described.

In block 420, the processor (or another processor configured to perform such analysis) may analyze the obtained data to recognize and classify detect payloads carried by the robotic vehicle. In some embodiments, the processor may use image recognition methods to distinguish objects within images and analyze the shapes of the objects to recognize or classify the objects. For example, the processor may compare image data to object recognition models to determine whether objects can be recognized as particular objects (e.g., the user based on facial recognition) or classified as certain types of objects (e.g., sturdy, fragile, expensive, unknown, etc.). As another example, using camera image data, the processor may perform image processing analysis to detect edges, masses and other features characteristic of payloads within the camera's field of view. As another example, the processor may detect payloads in a holding area of the robotic vehicle based on radar and/or lidar returns.

As a further operation in block 420, the processor may analyze detected payloads to determine an appropriate classification for the payload(s). For example, the processor may perform image recognition algorithms on image data to determine whether a structure is recognized as a particular type of payload. Such image recognition processes may compare images of a particular payload to databases of classified or classifiable payloads to determine whether there is a likelihood of a match. Such image recognition processes may use machine learning to develop models for use in assigning classifications to payloads.

In some embodiments, the processor may categorize payloads in terms of a few broad classifications in block 420, such as whether the payloads are proximity-sensitive, or whether the type of payload is known to be fragile or not, etc. In some embodiments, the processor may determine specific categories of payloads in block 420, such as recognizing and classifying payloads as valuable, fragile, etc. In some embodiments, the processor may determine specific identities of payloads in block 420, such as recognizing a particular type of equipment (e.g., a camera) or cargo (e.g., expensive merchandise) for which the processor may be trained (e.g., through an initial training routine) and for which particular (e.g., user-assigned) proximity threshold values may be specified. The more specific the classification made in block 420, the more different proximity thresholds may be assigned to various payloads by the processor.

As part of classifying payloads in block 420, the processor may determine that some payloads cannot be classified, in which case the determined classification may be unknown or a default classification. In some embodiments, the operations of classifying payloads in block 420 may be performed for all detected structures carried by the robotic vehicle or some subset thereof.

In determination block 425, the processor may determine whether a payload is carried by the robotic vehicle based on the data analyzed in block 420.

In response to determining that no payload is carried by the robotic vehicle (i.e., determination block 425="No"), the processor may set the proximity threshold to a default value in block 440. The default value of the proximity threshold may be a distance considered to be safe or non-threaten to surrounding objects when a payload is not carried by the robotic vehicle or when the payload carried by the robotic vehicle is not a proximity-sensitive class of payload.

In response to determining that a payload is carried by the robotic vehicle (i.e., determination block 425="Yes"), the processor may determine, in determination block 430, whether a proximity threshold change due to a classification of payload(s) is warranted. Thus, the processor may determine whether any structures analyzed in block 420 and determined to be a payload carried by the robotic vehicle in determination block 425 have a classification associated with or for which an adjustment in the proximity threshold is appropriate. For example, the processor may evaluate the payload classifications to determine whether one or more of the identified payloads is classified as sensitive, valuable, or otherwise proximity-sensitive. The default proximity threshold may be used for payloads for which a classification is not determined.

In response to determining that one or more detected payloads has a classification for which changing the priority threshold is appropriate (i.e., determination block 430="Yes"), the processor may set the proximity threshold used for collision avoidance to a value corresponding to that payload's classification in block 445. For example, if the processor has determined that a payload is an expensive cargo, the processor may increase the proximity threshold used by the collision avoidance system to a distance appropriate to ensure that a human or other creature may not get near the robotic vehicle. The amount by which the proximity threshold is adjusted (or the proximity threshold used) may be different for different types of classifications. For example, the proximity threshold used for payloads classified as sensitive may be smaller than the proximity threshold used for payloads classified as expensive.

In response to determining that none of the detected payloads are associated with a proximity threshold value different from the default value of the proximity threshold (i.e., determination block 430="No"), the processor may set the proximity threshold to the default value in block 440 if not already at the default level.

Setting the proximity threshold in blocks 440 and/or 445 may or may not involve changing the current proximity threshold value, depending on the current proximity threshold setting and the desired proximity threshold setting based on the determination as to what classification of payload is carried by the robotic vehicle. For example, setting the proximity threshold for collision avoidance may include raising the proximity threshold from a first value to a second value that is higher than the first value in response to determining that the proximity-sensitive class of payload is present. As a further example, setting the proximity threshold for collision avoidance may include lowering the proximity threshold to the first value from the second value in response to determining that the proximity-sensitive class of payload has been removed. Setting the proximity threshold for collision avoidance may also include maintaining the proximity threshold at a currently set value. For example, setting the proximity threshold for collision avoidance may include leaving the proximity threshold at the first value, which is lower than the second value, in response to determining that a payload is present and the currently set value of the proximity threshold is the first value. As a further example, setting the proximity threshold for collision avoidance may include leaving the proximity threshold at the second value, in response to determining that the appropriate value for the proximity threshold based on the class of identified payload is the second value.

Figure 5:
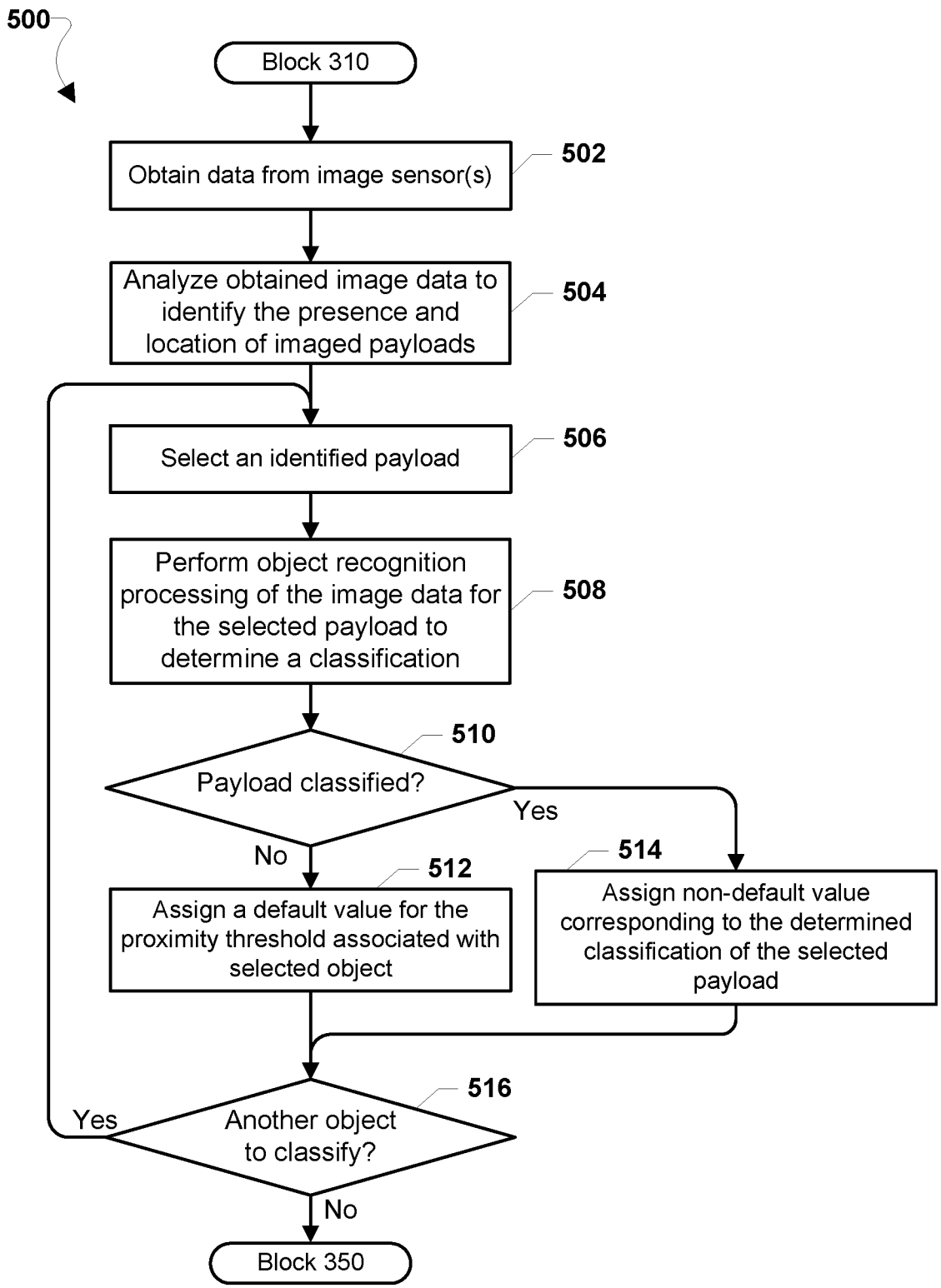
FIG. 5 is a process flow diagram illustrating a method of classifying payloads and assigning values for proximity thresholds based upon each payload's classification in accordance with various embodiments.

FIG. 5 illustrates a method 500 for detecting and classifying payloads for use in the method 500 according to some embodiments. With reference to FIGS. 1A-5, the method 500 may be performed by a processor, such as a processor (220) within a processing device (e.g., 210) of a robotic vehicle (e.g., 200) to detect payloads (e.g., 236) and perform an action in response.

In block 502, the processor may obtain data from image sensors, such as one or more cameras positioned on the robotic vehicle. The processor may also obtain other sensor data, such as radar or lidar data, that is useful for determining the relative location of payload objects or structures. Such data may be stored in local memory for processing, such as buffer memory.

In block 504, the processor may analyze the obtained image and other data to identify the presence and location of payloads. Such image analysis may involve identifying edges zones of different colors and other types of processes that are typically used to identify objects within images. In some embodiments, the robotic vehicle may be equipped with stereoscopic cameras for more accurately identifying objects.

Each of the payloads that are identified in block 504 may be individually analyzed using image recognition processes. To do so, the processor may implement a loop to individually investigate each identified payload. Thus, in block 506, the processor may select one of the identified payload, and perform object recognition processing on of the image data for the selected payload to determine the classification in block 508. As described, such image recognition processing may involve comparing image data to the database of classified payloads to determine whether there is a close match. Such image recognition processes may involve the use of machine learning techniques.

In determination block 510, the processor may determine whether a classification is assigned to the selected payload.

In response to determining that no classification is assigned to the selected payload (i.e., determination block 510="No"), the processor may assign a default value for the proximity threshold associated with the selected payload in block 512.

In response to determining that a classification is assigned to the selected payload (i.e., determination block 510="Yes"), the processor may assign to the selected payload a non-default value corresponding to the classification of the selected payload in block 514.

In determination block 516, the processor may determine whether there is another payload within the image data to be classified. If so (i.e., determination block 516="Yes"), the processor may select another identified payload in block 506 and repeat the operations of blocks 508-514 as described. When all payloads have been classified (i.e., determination block 516="No"), the processor may proceed to control motors of the robotic vehicle to govern how the robotic vehicle navigates using the currently set proximity threshold in block 350 of the method 300 as described.

Figure 6:
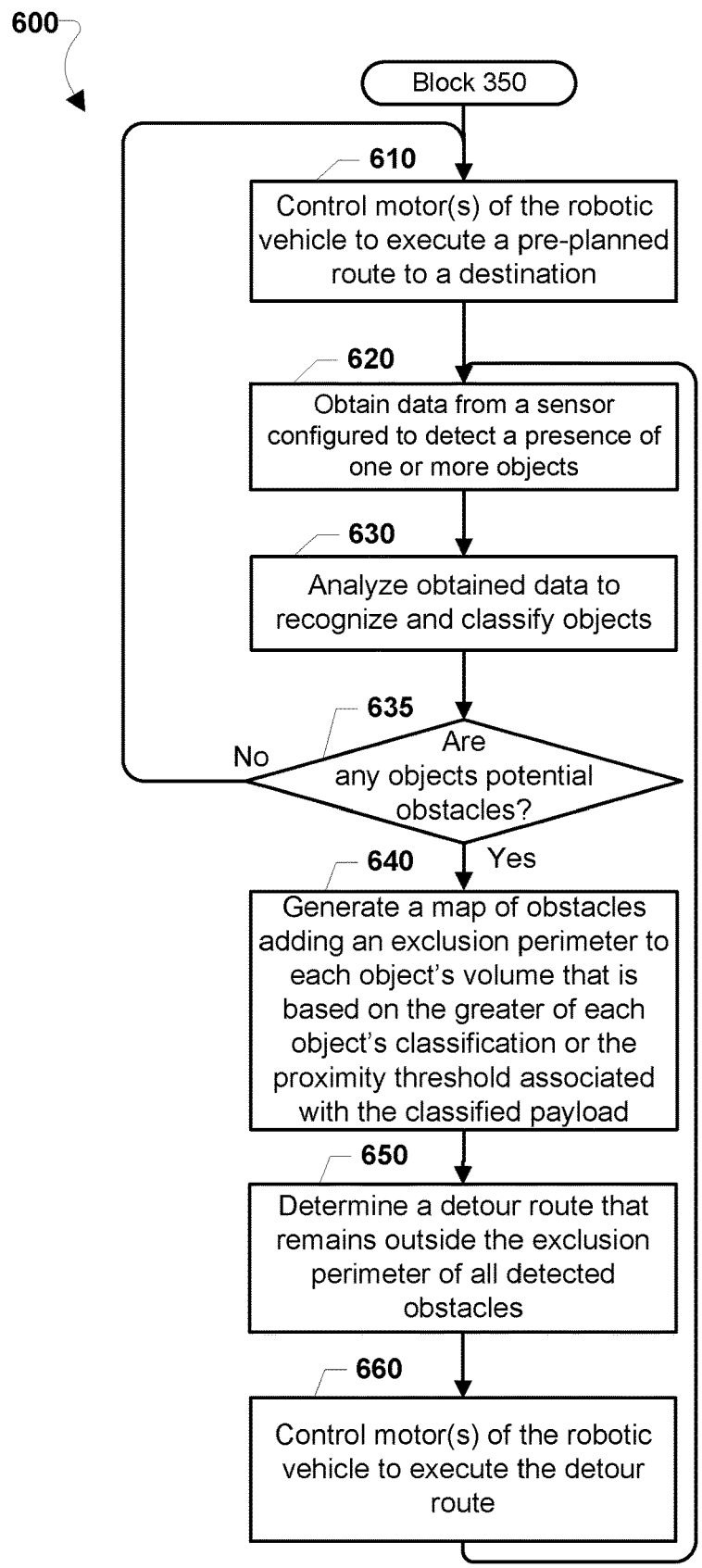
FIG. 6 is a process flow diagram illustrating method for operating a robotic vehicle including path planning to avoid each obstacle by at least an exclusion perimeter that depends upon a classification of the obstacle in accordance with various embodiments.

FIG. 6 illustrates a method 600 for operating a robotic vehicle according to some embodiments. With reference to FIGS. 1A-6, the method 600 may be performed by a processor, such as a processor (220) within a processing device (e.g., 210) of a robotic vehicle (e.g., 100, 200) to detect obstacles (e.g., 31-34, 40, 50) and perform an action in response.

In some embodiments, the processor of the robotic vehicle may use object detection and classifications to adjust proximity thresholds for a variety of detected objects, and ensure such proximity thresholds exceed the proximity threshold for a proximity-sensitive class of payload if such are being carried by the robotic vehicle, and then use such adjusted proximity thresholds while performing path planning around such objects. By evaluating each of the appropriate proximity thresholds for payloads carried by the robotic vehicle and each detected object within the vicinity of the robotic vehicle, the processor may develop a detour or path plan alternative that enables the robotic vehicle to maneuver around the objects in a manner that avoids approaching any objects closer than its corresponding proximity threshold or the proximity threshold for a proximity-sensitive class of payload. By performing such path planning, the robotic vehicle may follow an efficient path around or through detected objects compared to using the collision avoidance system to avoid colliding with individual obstacles, which could result in the robotic vehicle having to backtrack or follow a random path through a plurality of obstacles. Various methods for accomplishing such path planning are possible. The method 600 illustrated in FIG. 6 provides an example of one method that may be implemented for this purpose.

In block 610, the processor of the robotic vehicle may be controlling one or more motors of the robotic vehicle to execute a preplanned route to a destination.

In block 620, the processor may obtain data from one or more sensors that are configured to detect the presence of objects in the vicinity of the robotic vehicle. Such sensors may include one or more cameras, radar, lidar, etc. Data from such sensors may be stored in memory, such as buffer memory, to enable analysis by the processor.

In block 630, the processor (or another processor configured to perform such analysis) may analyze the obtained sensor data to detect objects that are in the vicinity of the robotic vehicle. For example, using camera image data, the processor may perform image processing analysis to detect edges, masses and other features characteristic of objects within the field of view. As another example, the processor may detect objects in the vicinity of the robotic vehicle based on radar and/or lidar returns. In some embodiments, radar and/or lidar data may be used to detect and locate nearby objects, with that information then leveraged in image processing to characterize the detected objects.

As a further operation in block 630, the processor may analyze detected objects to determine an appropriate classification for detected objects. For example, the processor may perform image recognition algorithms on image data to determine whether an object is recognized as a particular type. Such image recognition processes may compare images of a particular object to databases of classified or classifiable objects to determine whether there is a likelihood of a match. Such image recognition processes may use machine learning to develop models for use in assigning classifications to objects.

In some embodiments, the processor may categorize objects in terms of a few broad classifications in block 630, such as whether the objects are animate or inanimate, or whether the type of object is known to be fragile or not, etc. In some embodiments, the processor may determine specific categories of objects in block 630, such as recognizing and classifying objects as adults, children, dogs, cats, trees, etc. In some embodiments, the processor may determine specific identities of objects in block 630, such as recognizing particular individuals (e.g., using facial recognition) or particular animals (e.g., the family dog) for which the processor may be trained (e.g., through an initial training routine) and for which particular (e.g., user-assigned) proximity threshold values may be specified. The more specific the classification made in block 630, the more different proximity thresholds may be assigned to various objects by the processor.

As part of classifying objects in block 630, the processor may determine that some objects cannot be classified, in which case the determined classification may be unknown or a default classification. In some embodiments, the operations of classifying objects in block 630 may be performed for all detected objects in the vicinity of the robotic vehicle. In some embodiments only the closest or closest few objects may be classified in block 630.

In determination block 635, the processor may determine whether any of the identified and classified objects present obstacles or potential obstacles to the robotic vehicle. In particular, the processor may determine whether any of the objects identified in block 630 are close to the preplanned route to the destination.

In response to determining that no obstacles or potential obstacles are present in the vicinity of the robotic vehicle (i.e., determination block 635="No"), the processor may continue to control one or more motors of the robotic vehicle to execute the preplanned route to the destination in block 610.

In response to determining that one or more classified objects do or could present obstacles to the robotic vehicle (i.e., determination block 635="Yes"), the processor, in block 640, may generate a virtual map of the objects that add in an exclusion perimeter around each object based on the greater of that object's classification or the proximity threshold associated with the classified payload determined in block 420 of the method 400. Thus, instead of adjusting the proximity threshold used in the collision avoidance system, the processor may use the corresponding proximity threshold and the proximity threshold associated with the classified payload to extend the boundary of an object as represented in the virtual map generated in block 640. A default value of the proximity threshold may be used for adding an exclusion perimeter around objects (i.e., no change to the proximity threshold) for which a classification is not determined when the robotic vehicle is not carrying a payload for which an enhanced proximity threshold is appropriate.

In block 650, the processor may use the map generated in block 640 to determine a detour route around or through the identified obstacles that ensures the robotic vehicle remains outside of the respective proximity threshold for all obstacles. The processor may accomplish such path planning using any of a variety of path planning algorithms. Using the object classification-specific proximity thresholds to add exclusion perimeters around objects in block 640 facilitates planning a path that maneuvers around objects by at least their respective proximity thresholds.

In block 660, the processor may control one or more motors of the robotic vehicle to execute the detour route. Doing so, the processor may continue to obtain data from various sensors in block 620 and analyze the sensor data to recognizing classify nearby objects in block 630 as described. Once the robotic vehicle has cleared the obstacles, such as by completing the detour route (i.e., determination block 635="No"), the processor may return to controlling the one or more motors of the robotic vehicle to execute the preplanned route to the destination in block 610, and repeat the operations of the methods 300, 400, 500, and/or 600 as described.

Figure 7:
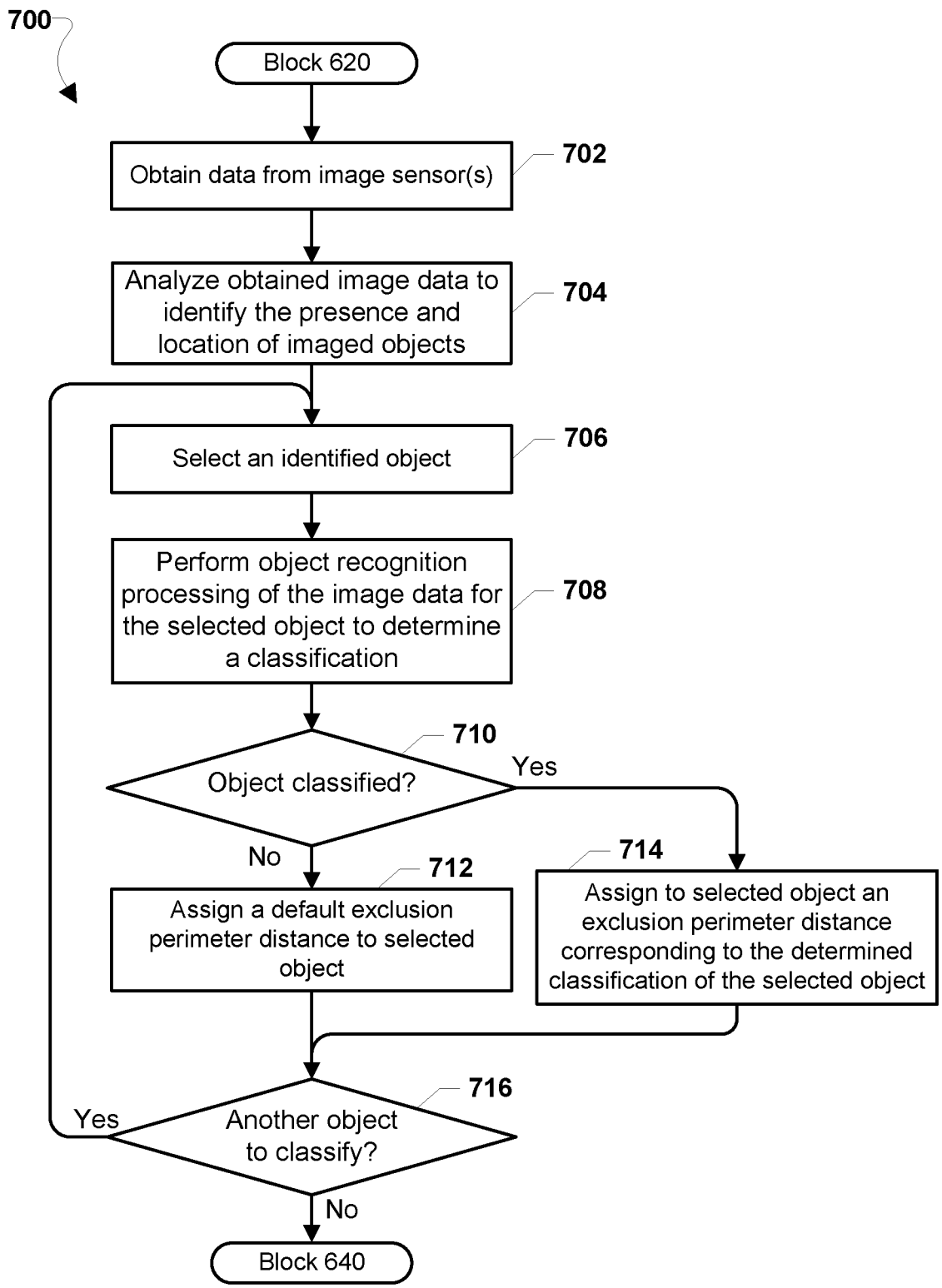
FIG. 7 is a process flow diagram illustrating a method of classifying objects and assigning exclusion perimeter distances to the objects based upon each object's classification in accordance with various embodiments.

FIG. 7 illustrates a method 700 for detecting and classifying objects for use in the method 600 according to some embodiments. With reference to FIGS. 1A-7, the method 700 may be performed by a processor, such as a processor (220) within a processing device (e.g., 210) of a robotic vehicle (e.g., 200) to detect obstacles (e.g., 120) and perform an action in response.

In block 702, the processor may obtain data from image sensors, such as one or more cameras positioned on the robotic vehicle. The processor may also obtain other sensor data, such as radar or lidar data, that is useful for determining the relative location of objects. Such data may be stored in local memory for processing, such as buffer memory.

In block 704, the processor may analyze the obtained image and other data to identify the presence and location of the imaged objects. Such image analysis may involve identifying edges zones of different colors and other types of processes that are typically used to identify objects within images. In some embodiments, the robotic vehicle may be equipped with stereoscopic cameras which may enable the processor to determine the distance to various objects using stereoscopy. In embodiments in which the robotic vehicle is equipped with only a monocular camera, distances to various objects may be determined based on the shift in position of objects from one frame to the next as the robotic vehicle moves to the environment. In embodiments in which the robotic vehicle is equipped with radar and/or lidar, the distances to objects may be determined using data from those sensors. In determining the location of objects, the processor may generate a file or database of object coordinates in memory that enables the processor to generate a map of objects in subsequent operations.

Each of the objects that are identified in block 704 may be individually analyzed using image recognition processes. To do so, the processor may implement a loop to individually investigate each object. Thus, in block 706, the processor may select one of the identified objects, and perform object recognition processing on of the image data for the selected object to determine the classification in block 708. As described, such image recognition processing may involve comparing image data to the database of classified objects to determine whether there is a close match. Such image recognition processes may involve the use of machine learning techniques.

In determination block 710, the processor may determine whether a classification is assigned to the selected object.

In response to determining that no classification is assigned to the selected object (i.e., determination block 710="No"), the processor may assign a default exclusion perimeter distance to the selected object in block 712.

In response to determining that a classification is assigned to the selected object (i.e., determination block 710="Yes"), the processor may assign to the selected object in exclusion perimeter distance corresponding to the classification of the selected object in block 714.

In determination block 716, the processor may determine whether there is another object within the image data to be classified. If so (i.e., determination block 716="Yes"), the processor may select another identified object in block 706 and repeat the operations of blocks 708-714 as described. When all objects have been classified (i.e., determination block 716="No"), the processor may proceed to generate a map of objects adding the exclusion perimeter based on each objects classification in block 620 of the method 600 as described.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any example embodiment. For example, one or more of the operations of the methods 300, 400, 500, 600, and/or 700 may be substituted for or combined with another.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for operating a robotic vehicle, comprising:
   determining, by a processor, whether a payload is carried by the robotic vehicle;
   setting, by the processor, a proximity threshold for collision avoidance, wherein the proximity threshold is based on the determination whether the payload is carried by the robotic vehicle;
   detecting one or more objects in proximity to the robotic vehicle;
   determining a path based on the detected one or more objects and the proximity threshold; and
   controlling, by the processor, one or more motors of the robotic vehicle to navigate the robotic vehicle along the path.

2. The method of claim 1, wherein setting the proximity threshold for collision avoidance comprises raising the proximity threshold from a first value to a second value that is higher than the first value in response to determining that a payload is not being carried by the robotic vehicle.

3. The method of claim 1, wherein setting the proximity threshold for collision avoidance comprises lowering the proximity threshold to a first value from a second value that is higher than the first value in response to determining that a payload is being carried by the robotic vehicle.

4. The method of claim 1, wherein setting the proximity threshold for collision avoidance comprises maintaining the proximity threshold at a currently set value.

5. The method of claim 1, wherein determining, by a processor, whether a payload is carried by the robotic vehicle comprises:
   obtaining, by the processor, data from a payload sensor configured to detect whether a payload is being carried by the robotic vehicle; and
   determining whether a payload is being carried by the robotic vehicle based on the obtained data.

6. The method of claim 5, wherein the payload sensor is at least one of a contact sensor, a weight sensor, an image sensor, or a radio-frequency identification tag reader.

7. The method of claim 5, wherein analyzing the obtained data to determine whether a payload is being carried by the robotic vehicle comprises:
   comparing the obtained data to previously collected data indicating a payload is being carried by the robotic vehicle;
   determining that a payload is carried by the robotic vehicle in response to determining that the obtained data match previously collected data indicating a payload is being carried by the robotic vehicle; and
   determining that a payload is not carried by the robotic vehicle in response to determining that the obtained data do not match the previously collected data indicating a payload is being carried by the robotic vehicle.

8. The method of claim 5, wherein determining whether a payload is being carried by the robotic vehicle based on the obtained data comprises:

comparing the obtained data to predetermined parameters indicating one or more payloads is being carried by the robotic vehicle;
determining that a payload is carried by the robotic vehicle in response to determining that the obtained data match the predetermined parameters indicating a payload is being carried by the robotic vehicle; and
determining that a payload is not be carried by the robotic vehicle in response to determining that the obtained data not matching the predetermined parameters indicating a payload is being carried by the robotic vehicle.

9. The method of claim 5, wherein determining whether a payload is being carried by the robotic vehicle based on the obtained data comprises determining how many payloads are carried by the robotic vehicle.

10. The method of claim 1, further comprising:
obtaining, by the processor, data from one or more motors indicating a rate of revolution of respective one or more motors, and
wherein the determining whether a payload is being carried by the robotic vehicle is based on the rate of revolution of respective one or more motors.

11. The method of claim 1, further comprising:
receiving, by the processor, an input override indicating whether a payload is carried by the robotic vehicle, wherein determining whether a payload is being carried by the robotic vehicle is based on the received input override.

12. The method of claim 1, further comprising:
determining, by the processor, a classification of the payload in response to determining that a payload is carried by the robotic vehicle; and
wherein the proximity threshold is further based on the classification of the payload.

13. The method of claim 12, wherein setting the proximity threshold based on the classification of the payload comprises changing the proximity threshold from a default value to an adjusted value corresponding to the classification of the payload.

14. The method of claim 12, wherein:
determining a classification of the payload comprises determining whether the payload is a proximity-sensitive class of payload; and
wherein the proximity threshold for collision avoidance is based on the classification of the payload comprises increasing or decreasing the proximity threshold in response to the classification of the payload being the proximity-sensitive class of payload.

15. The method of claim 14, wherein a proximity-sensitive class of payload includes one or more of a camera, rotors larger than a predetermined span, or equipment of the robotic vehicle or cargo more valuable than a predetermined amount.

16. The method of claim 12, further comprising determining the proximity threshold corresponding to the determined classification of the payload by accessing a data structure in memory for the proximity threshold correlated to the classification of the payload.

17. The method of claim 12, further comprising:
determining, by the processor based on the object data, whether the one or more objects pose an obstacle or potential obstacle to the robotic vehicle; and
determining, by the processor, a classification of an object posing an obstacle or potential obstacle to the robotic vehicle,
wherein the proximity threshold is based on a larger of the proximity threshold determined based on the classification of the payload and a proximity threshold for the classification of the object posing an obstacle or potential obstacle to the robotic vehicle.

18. A robotic vehicle, comprising:
one or more rotors;
one or more sensors;
a processor coupled to the one or more rotors and the one or more sensors, wherein the processor configured to:
determine whether a payload is carried by the robotic vehicle;
set a proximity threshold for collision avoidance, wherein the proximity threshold is based on the determination whether the payload is carried by the robotic vehicle;
detect one or more objects in proximity to the robotic vehicle;
determining a path based on the detected one or more objects and the proximity threshold; and
control the one or more motors to navigate the robotic vehicle along the path.

19. The robotic vehicle of claim 18, wherein the processor is configured to set the proximity threshold for collision avoidance by raising the proximity threshold from a first value to a second value that is higher than the first value in response to determining that a payload is not being carried by the robotic vehicle.

20. The robotic vehicle of claim 18, wherein the processor is configured to set the proximity threshold for collision avoidance by lowering the proximity threshold to a first value from a second value that is higher than the first value in response to determining that a payload is being carried by the robotic vehicle.

21. The robotic vehicle of claim 18, wherein the processor is configured to set the proximity threshold for collision avoidance by maintaining the proximity threshold at a currently set value.

22. The robotic vehicle of claim 18, wherein the processor is configured to determine whether a payload is carried by the robotic vehicle by:
obtaining data from a payload sensor configured to detect whether a payload is being carried by the robotic vehicle; and
determine whether the payload is being carried by the robotic vehicle based on the obtained data.

23. The robotic vehicle of claim 22, wherein the processor is configured to determine whether a payload is being carried by the robotic vehicle by:
comparing the obtained data to previously collected data indicating a payload is being carried by the robotic vehicle;
determining that a payload is carried by the robotic vehicle in response to determining that the obtained data match previously collected data indicating a payload is being carried by the robotic vehicle; and
determining that a payload is not carried by the robotic vehicle in response to determining that the obtained data do not match the previously collected data indicating a payload is being carried by the robotic vehicle.

24. The robotic vehicle of claim 22, wherein the processor is configured to determine whether a payload is being carried by the robotic vehicle by:
comparing the obtained data to predetermined parameters indicating one or more payloads is being carried by the robotic vehicle;
determining that a payload is carried by the robotic vehicle in response to determining that the obtained data match the predetermined parameters indicating a payload is being carried by the robotic vehicle; and determining that a payload is not be carried by the robotic vehicle in response to determining that the obtained data not matching the predetermined parameters indicating a payload is being carried by the robotic vehicle.

25. The robotic vehicle of claim 22, wherein the processor is configured to determine whether a payload is being carried by the robotic vehicle by determining how many payloads are carried by the robotic vehicle.

26. The robotic vehicle of claim 18, wherein the processor is further configured to:

obtain data from one or more motors indicating a rate of revolution of respective one or more motors, and determine whether a payload is being carried by the robotic vehicle based on the rate of revolution of respective one or more motors.

27. The robotic vehicle of claim 18, wherein the processor is further configured to:

determine a classification of the payload in response to determining that a payload is carried by the robotic vehicle; and wherein the proximity threshold is further based on the classification of the payload.

28. The robotic vehicle of claim 27, wherein the processor is further configured to:

determine a classification of the payload by determining whether the payload is a proximity-sensitive class of payload, wherein a proximity-sensitive class of payload includes one or more of a camera, rotors larger than a predetermined span, or equipment of the robotic vehicle or cargo more valuable than a predetermined amount; and wherein the proximity threshold for collision avoidance to the value based on the classification of the payload by increasing or decreasing the proximity threshold in response to the classification of the payload being the proximity-sensitive class of payload.

29. A processing device for use in a robotic vehicle, the processing device configured to:

determine whether a payload is carried by the robotic vehicle;

set a proximity threshold for collision avoidance, wherein the proximity threshold is based on the determination whether the payload is carried by the robotic vehicle;

detect one or more objects in proximity to the robotic vehicle;

determine a path based on the detected one or more objects and the proximity threshold; and control one or more motors of the robotic vehicle to navigate the robotic vehicle along the path.

30. A robotic vehicle, comprising:

means for determining whether a payload is carried by the robotic vehicle;

means for setting a proximity threshold for collision avoidance, wherein the proximity threshold is based on the determination whether the payload is carried by the robotic vehicle;

means for detecting one or more objects in proximity to the robotic vehicle;

means for determining a path based on the detected one or more objects and the proximity threshold; and means for controlling one or more motors of the robotic vehicle to navigate the robotic vehicle along the path.

* * * * *